United States Patent
Boghani et al.

(10) Patent No.: US 8,455,033 B2
(45) Date of Patent: *Jun. 4, 2013

(54) TASTE POTENTIATOR COMPOSITIONS AND EDIBLE CONFECTIONERY AND CHEWING GUM PRODUCTS CONTAINING SAME

(75) Inventors: Navroz Boghani, Flanders, NJ (US); Petros Gebreselassie, Piscataway, NJ (US); Carole Ann Bingley, Reading (GB)

(73) Assignee: Kraft Foods Global Brands LLC, Northfield, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 12/941,328

(22) Filed: Nov. 8, 2010

(65) Prior Publication Data

US 2011/0280990 A1 Nov. 17, 2011

Related U.S. Application Data

(62) Division of application No. 11/439,811, filed on May 23, 2006, now Pat. No. 7,879,376.

(60) Provisional application No. 60/683,634, filed on May 23, 2005, provisional application No. 60/760,437, filed on Jan. 20, 2006, provisional application No. 60/789,667, filed on Apr. 6, 2006.

(51) Int. Cl.
*A26L 1/236* (2006.01)

(52) U.S. Cl.
USPC ........... 426/535; 426/537; 426/458; 426/660; 426/5

(58) Field of Classification Search
USPC ............... 426/535, 537, 548, 660, 5
See application file for complete search history.

(56) References Cited

U.S. PATENT DOCUMENTS

| | | | |
|---|---|---|---|
| 1,633,336 A | 6/1927 | Larson |
| 1,936,456 A | 11/1933 | Larson et al. |
| 2,191,199 A | 2/1940 | Hall |
| 2,197,719 A | 4/1940 | Conner |
| 2,876,167 A | 3/1959 | Manahan |
| 2,886,440 A | 5/1959 | Kramer et al. |
| 2,886,441 A | 5/1959 | Kramer et al, |
| 2,886,442 A | 5/1959 | Kramer et al, |

(Continued)

FOREIGN PATENT DOCUMENTS

| CA | 1 208 966 | 5/1986 |
|---|---|---|
| CA | 2 238 925 A1 | 11/1999 |

(Continued)

OTHER PUBLICATIONS

JP 02083030 A—Lion Corp., "Microcapsule for Foods", Mar. 23, 1990, Abstract.

(Continued)

*Primary Examiner* — Humera Sheikh
*Assistant Examiner* — Hong T Yoo
(74) *Attorney, Agent, or Firm* — Cantor Colburn LLP

(57) ABSTRACT

The present invention relates to compositions and edible orally delivered products, such as confectioneries and chewing gum, which include taste potentiators to enhance the perception of active substances contained therein. More specifically, some embodiments provide potentiator compositions, which include at least one active substance and at least one taste potentiator. The active substance and/or taste potentiator may be encapsulated in some embodiments to modify the release rate of the composition upon consumption.

16 Claims, 10 Drawing Sheets

Blends of 2,4-Dihydroxybenzoic acid, 3-Hydroxybenzoic acid and 3,4-Dihydroxybenzoic acid

U.S. PATENT DOCUMENTS

| | | |
|---|---|---|
| 2,886,443 A | 5/1959 | Rosenthal et al. |
| 2,886,444 A | 5/1959 | Rosenthal et al. |
| 2,886,445 A | 5/1959 | Rosenthal et al. |
| 2,886,446 A | 5/1959 | Kramer et al. |
| 2,886,449 A | 5/1959 | Rosenthal et al. |
| 3,004,897 A | 10/1961 | Shore |
| 3,052,552 A | 9/1962 | Koerner et al. |
| 3,117,027 A | 1/1964 | Lindlof et al. |
| 3,124,459 A | 3/1964 | Erwin |
| 3,159,585 A | 12/1964 | Evans et al. |
| 3,241,520 A | 3/1966 | Wurster et al. |
| 3,427,380 A | 2/1969 | Kirkland |
| 3,475,533 A | 10/1969 | Mayrand |
| 3,538,230 A | 11/1970 | Pader et al. |
| 3,574,826 A | 4/1971 | Shepherd et al. |
| 3,664,962 A | 5/1972 | Kelly et al. |
| 3,664,963 A | 5/1972 | Pasin |
| 3,677,771 A | 7/1972 | Kolar, Jr. |
| 3,795,744 A | 3/1974 | Ogawa et al. |
| 3,819,838 A | 6/1974 | Smith et al. |
| 3,821,417 A | 6/1974 | Westall et al. |
| 3,826,847 A | 7/1974 | Ogawa et al. |
| 3,857,964 A | 12/1974 | Yolles |
| 3,862,307 A | 1/1975 | Di Giulio |
| 3,872,021 A | 3/1975 | McKnight |
| 3,878,938 A | 4/1975 | Venables et al. |
| 3,912,817 A | 10/1975 | Sapsowitz |
| 3,930,026 A | 12/1975 | Clark |
| 3,943,258 A | 3/1976 | Bahoshy et al. |
| 3,962,416 A | 6/1976 | Katzen |
| 3,962,463 A | 6/1976 | Witzel |
| 3,974,293 A | 8/1976 | Witzel |
| 3,984,574 A | 10/1976 | Comollo |
| 4,032,661 A | 6/1977 | Rowsell et al. |
| 4,037,000 A | 7/1977 | Burge et al. |
| 4,045,581 A | 8/1977 | Mackay et al. |
| 4,083,995 A | 4/1978 | Mitchell et al. |
| 4,107,360 A | 8/1978 | Schmidgall |
| 4,130,638 A | 12/1978 | Dhabhar et al. |
| 4,136,163 A | 1/1979 | Watson et al. |
| 4,139,639 A | 2/1979 | Bahoshy et al. |
| 4,148,872 A | 4/1979 | Wagenknecht et al. |
| 4,150,112 A | 4/1979 | Wagenknecht et al. |
| 4,156,715 A | 5/1979 | Wagenknecht et al. |
| 4,156,716 A | 5/1979 | Wagenknecht et al. |
| 4,157,385 A | 6/1979 | Wagenknecht et al. |
| 4,159,315 A | 6/1979 | Wagenknecht et al. |
| 4,160,054 A | 7/1979 | Wagenknecht et al. |
| 4,160,820 A | 7/1979 | Wagenknecht et al. |
| 4,187,320 A | 2/1980 | Koch et al. |
| 4,208,431 A | 6/1980 | Friello et al. |
| 4,217,368 A | 8/1980 | Witzel et al. |
| 4,224,345 A | 9/1980 | Tezuka et al. |
| 4,230,688 A | 10/1980 | Rowsell et al. |
| 4,252,830 A | 2/1981 | Kehoe et al. |
| 4,271,199 A | 6/1981 | Cherukuri et al. |
| 4,276,312 A | 6/1981 | Merritt |
| 4,295,845 A | 10/1981 | Sepulveda et al. |
| 4,314,990 A | 2/1982 | Denny, Jr. et al. |
| 4,340,583 A | 7/1982 | Wason |
| 4,352,823 A | 10/1982 | Cherukuri et al. |
| 4,352,825 A | 10/1982 | Cherukuri et al. |
| 4,363,756 A | 12/1982 | Sepulveda et al. |
| 4,384,004 A | 5/1983 | Cea et al. |
| 4,386,106 A | 5/1983 | Merritt et al. |
| 4,452,821 A | 6/1984 | Gergely |
| 4,457,857 A | 7/1984 | Sepulveda et al. |
| 4,459,425 A | 7/1984 | Amano et al. |
| 4,485,118 A | 11/1984 | Carroll et al. |
| 4,513,012 A | 4/1985 | Carroll et al. |
| 4,515,769 A | 5/1985 | Merritt et al. |
| 4,585,649 A | 4/1986 | Lynch |
| 4,590,075 A | 5/1986 | Wei et al. |
| 4,597,970 A | 7/1986 | Sharma et al. |
| 4,603,012 A | 7/1986 | Zanno et al. |
| 4,613,512 A | 9/1986 | Barnett et al. |
| 4,614,649 A | 9/1986 | Gorman et al. |
| 4,614,654 A | 9/1986 | Ream et al. |
| 4,619,834 A | 10/1986 | Zanno et al. |
| 4,622,232 A | 11/1986 | Zanno et al. |
| 4,622,417 A | 11/1986 | Barnett et al. |
| 4,627,987 A | 12/1986 | Barnett et al. |
| 4,634,593 A | 1/1987 | Stroz et al. |
| 4,636,396 A | 1/1987 | Zanno et al. |
| 4,650,688 A | 3/1987 | Roy et al. |
| 4,652,457 A | 3/1987 | Zanno et al. |
| 4,654,219 A | 3/1987 | Barnett et al. |
| 4,673,577 A | 6/1987 | Patel |
| 4,676,989 A | 6/1987 | Barnett et al. |
| 4,678,674 A | 7/1987 | Zanno et al. |
| 4,678,675 A | 7/1987 | Zanno et al. |
| 4,701,552 A | 10/1987 | Zanno et al. |
| 4,711,784 A | 12/1987 | Yang |
| 4,722,845 A | 2/1988 | Cherukuri et al. |
| 4,724,151 A | 2/1988 | Mansukhani et al. |
| 4,726,953 A | 2/1988 | Carroll et al. |
| 4,740,376 A | 4/1988 | Yang |
| 4,741,905 A | 5/1988 | Huzinec |
| 4,749,575 A | 6/1988 | Rotman |
| 4,751,095 A | 6/1988 | Karl et al. |
| 4,752,481 A | 6/1988 | Dokuzovic |
| 4,753,790 A | 6/1988 | Silva et al. |
| 4,758,443 A | 7/1988 | Roy et al. |
| 4,771,784 A | 9/1988 | Kozin et al. |
| 4,781,927 A | 11/1988 | Zanno et al. |
| 4,788,073 A | 11/1988 | Zanno et al. |
| 4,800,087 A | 1/1989 | Mehta |
| 4,804,548 A | 2/1989 | Sharma et al. |
| 4,816,265 A | 3/1989 | Cherukuri et al. |
| 4,822,599 A | 4/1989 | Mitra |
| 4,822,635 A | 4/1989 | Zanno et al. |
| 4,824,681 A | 4/1989 | Schobel et al. |
| 4,828,845 A | 5/1989 | Zamudio-Tena et al. |
| 4,828,857 A | 5/1989 | Sharma et al. |
| 4,842,762 A | 6/1989 | Sabol, Jr. et al. |
| 4,871,570 A | 10/1989 | Barnett et al. |
| 4,904,482 A | 2/1990 | Patel et al. |
| 4,911,934 A | 3/1990 | Yang et al. |
| 4,915,958 A | 4/1990 | Faust et al. |
| 4,918,182 A | 4/1990 | Jackson et al. |
| 4,919,841 A | 4/1990 | Kamel et al. |
| 4,923,684 A | 5/1990 | Ibrahim et al. |
| 4,927,646 A | 5/1990 | Jenner et al. |
| 4,929,447 A | 5/1990 | Yang |
| 4,931,293 A | 6/1990 | Cherukuri et al. |
| 4,933,190 A | 6/1990 | Cherukuri et al. |
| 4,952,407 A | 8/1990 | Record et al. |
| 4,971,797 A | 11/1990 | Cherukuri et al. |
| 4,971,806 A | 11/1990 | Cherukuri et al. |
| 4,978,537 A | 12/1990 | Song |
| 4,981,698 A | 1/1991 | Cherukuri et al. |
| 4,985,236 A | 1/1991 | Ibrahim et al. |
| 4,986,991 A | 1/1991 | Yatka et al. |
| 4,997,659 A | 3/1991 | Yatka et al. |
| 5,004,595 A | 4/1991 | Cherukuri et al. |
| 5,009,893 A | 4/1991 | Cherukuri et al. |
| 5,009,900 A | 4/1991 | Levine et al. |
| 5,017,385 A | 5/1991 | Wienecke |
| 5,043,154 A | 8/1991 | Gaffar et al. |
| 5,043,169 A | 8/1991 | Cherukuri et al. |
| 5,057,327 A | 10/1991 | Yatka et al. |
| 5,057,328 A | 10/1991 | Cherukuri et al. |
| 5,059,429 A | 10/1991 | Cherukuri et al. |
| 5,064,658 A | 11/1991 | Cherukuri et al. |
| 5,073,389 A | 12/1991 | Wienecke |
| 5,080,877 A | 1/1992 | Chane-Ching et al. |
| 5,082,671 A | 1/1992 | Cherukuri |
| 5,084,278 A | 1/1992 | Mehta |
| 5,085,850 A | 2/1992 | Pan et al. |
| 5,096,699 A | 3/1992 | Gaffar et al. |
| 5,096,701 A | 3/1992 | White, Jr. et al. |
| 5,100,678 A | 3/1992 | Reed et al. |
| 5,108,763 A | 4/1992 | Chau et al. |
| 5,126,151 A | 6/1992 | Bodor et al. |
| 5,139,793 A | 8/1992 | Johnson et al. |
| 5,139,794 A | 8/1992 | Patel et al. |
| 5,139,798 A | 8/1992 | Yatka et al. |

| | | | | | |
|---|---|---|---|---|---|
| 5,154,939 A | 10/1992 | Broderick et al. | 6,027,746 A | 2/2000 | Lech |
| 5,164,210 A | 11/1992 | Campbell et al. | 6,056,992 A | 5/2000 | Lew |
| 5,169,657 A | 12/1992 | Yatka et al. | 6,159,509 A | 12/2000 | Johnson et al. |
| 5,169,658 A | 12/1992 | Yatka et al. | 6,174,514 B1 | 1/2001 | Cherukuri et al. |
| 5,174,514 A | 12/1992 | Prodi | 6,190,644 B1 | 2/2001 | McClanahan et al. |
| 5,176,900 A | 1/1993 | White, Jr. et al. | 6,238,690 B1 | 5/2001 | Kiefer et al. |
| 5,192,563 A | 3/1993 | Patel et al. | 6,251,193 B1 | 6/2001 | Rossy et al. |
| 5,198,251 A | 3/1993 | Song et al. | 6,261,540 B1 | 7/2001 | Nelson |
| 5,202,112 A | 4/1993 | Prencipe et al. | 6,290,933 B1 | 9/2001 | Durga et al. |
| 5,208,009 A | 5/1993 | Gaffar et al. | 6,365,209 B2 | 4/2002 | Cherukuri |
| 5,226,335 A | 7/1993 | Sitte et al. | 6,368,651 B1 | 4/2002 | Gerlat et al. |
| 5,227,182 A | 7/1993 | Song et al. | 6,379,654 B1 | 4/2002 | Gebreselassie et al. |
| 5,229,148 A | 7/1993 | Copper | 6,416,744 B1 | 7/2002 | Robinson et al. |
| 5,232,735 A | 8/1993 | Kurtz et al. | 6,428,827 B1 | 8/2002 | Song et al. |
| 5,240,710 A | 8/1993 | Bar-Shalom et al. | 6,461,658 B1 | 10/2002 | Merkel et al. |
| 5,256,402 A | 10/1993 | Prencipe et al. | 6,471,945 B2 | 10/2002 | Luo et al. |
| 5,266,336 A | 11/1993 | McGrew et al. | 6,475,469 B1 | 11/2002 | Montgomery |
| 5,266,592 A | 11/1993 | Grub et al. | 6,479,071 B2 | 11/2002 | Holme et al. |
| 5,273,741 A | 12/1993 | Gaftar et al. | 6,485,739 B2 | 11/2002 | Luo et al. |
| 5,300,283 A | 4/1994 | Prencipe et al. | 6,506,366 B1 | 1/2003 | Leinen et al. |
| 5,334,375 A | 8/1994 | Nabi et al. | 6,534,091 B1 | 3/2003 | Garces Garces et al. |
| 5,334,396 A | 8/1994 | Yatka | 6,555,145 B1 | 4/2003 | Cherukuri |
| 5,334,397 A | 8/1994 | Ream et al. | 6,586,023 B1 | 7/2003 | Song et al. |
| 5,336,509 A | 8/1994 | McGrew et al. | 6,627,233 B1 | 9/2003 | Wolf et al. |
| 5,352,439 A | 10/1994 | Norfleet et al. | 6,627,234 B1 | 9/2003 | Johnson et al. |
| 5,364,627 A | 11/1994 | Song | 6,685,916 B1 | 2/2004 | Holme et al. |
| 5,372,824 A | 12/1994 | Record et al. | 6,692,778 B2 | 2/2004 | Yatka et al. |
| 5,380,530 A | 1/1995 | Hill | 6,696,044 B2 | 2/2004 | Luo et al. |
| 5,385,729 A | 1/1995 | Prencipe et al. | 6,759,066 B2 | 7/2004 | Savage et al. |
| 5,391,315 A | 2/1995 | Ashkin | 6,761,879 B1 | 7/2004 | Finidori |
| 5,407,665 A | 4/1995 | McLaughlin et al. | 6,761,919 B2 | 7/2004 | Blyth et al. |
| 5,413,799 A | 5/1995 | Song et al. | 6,780,443 B1 | 8/2004 | Nakatsu et al. |
| 5,415,880 A | 5/1995 | Song et al. | 6,955,887 B2 | 10/2005 | Adler et al. |
| 5,431,930 A | 7/1995 | Patel et al. | 6,974,597 B2 | 12/2005 | Ohta et al. |
| 5,437,876 A | 8/1995 | Synosky et al. | 7,022,352 B2 | 4/2006 | Castro et al. |
| 5,437,878 A | 8/1995 | Panhorst et al. | 7,025,999 B2 | 4/2006 | Johnson et al. |
| 5,458,879 A | 10/1995 | Singh et al. | 7,851,000 B2 | 12/2010 | Boghani et al. |
| 5,462,754 A | 10/1995 | Synosky et al. | 7,851,005 B2 | 12/2010 | Bingley et al. |
| 5,474,787 A | 12/1995 | Grey et al. | 7,851,006 B2 | 12/2010 | Bingley et al. |
| 5,480,668 A | 1/1996 | Nofre et al. | 7,879,376 B2 | 2/2011 | Boghani et al. |
| 5,487,902 A | 1/1996 | Andersen et al. | 2002/0044968 A1 | 4/2002 | van Lengerich |
| 5,498,378 A | 3/1996 | Tsaur et al. | 2002/0054859 A1 | 5/2002 | Alvarez Hernandez |
| 5,501,864 A | 3/1996 | Song et al. | 2002/0122842 A1 | 9/2002 | Seielstad et al. |
| 5,503,823 A | 4/1996 | Norfleet et al. | 2002/0150616 A1 | 10/2002 | Vandecruys |
| 5,505,933 A | 4/1996 | Norfleet et al. | 2003/0026878 A1 | 2/2003 | Corriveau et al. |
| 5,523,098 A | 6/1996 | Synosky et al. | 2003/0054448 A1 | 3/2003 | Adler et al. |
| 5,532,004 A | 7/1996 | Bell et al. | 2003/0059519 A1 | 3/2003 | Merkel et al. |
| 5,545,424 A | 8/1996 | Nakatsu et al. | 2003/0072842 A1 | 4/2003 | Johnson et al. |
| 5,582,816 A | 12/1996 | Mandanas et al. | 2003/0077362 A1 | 4/2003 | Panhorst et al. |
| 5,589,160 A | 12/1996 | Rice | 2003/0091721 A1 | 5/2003 | Ohta et al. |
| 5,589,194 A | 12/1996 | Tsuei et al. | 2003/0099740 A1 | 5/2003 | Colle et al. |
| 5,599,527 A | 2/1997 | Hsu et al. | 2003/0113274 A1 | 6/2003 | Holme et al. |
| 5,603,920 A | 2/1997 | Rice | 2003/0170608 A1 | 9/2003 | Pronin et al. |
| 5,603,971 A | 2/1997 | Porzio et al. | 2003/0232407 A1 | 12/2003 | Zoller et al. |
| 5,618,517 A | 4/1997 | Miskewitz | 2004/0072254 A1 | 4/2004 | Callamaras et al. |
| 5,626,892 A | 5/1997 | Kehoe et al. | 2004/0132075 A1 | 7/2004 | Elliot et al. |
| 5,629,035 A | 5/1997 | Miskewitz | 2004/0136928 A1 | 7/2004 | Holme et al. |
| 5,637,618 A | 6/1997 | Kurtz et al. | 2004/0146599 A1 | 7/2004 | Andersen et al. |
| 5,645,821 A | 7/1997 | Libin | 2004/0171042 A1 | 9/2004 | Adler et al. |
| 5,651,958 A | 7/1997 | Rice | 2004/0175489 A1 | 9/2004 | Clark et al. |
| 5,658,553 A | 8/1997 | Rice | 2004/0175792 A1 | 9/2004 | Zoller et al. |
| 5,676,932 A | 10/1997 | Wason et al. | 2004/0175793 A1 | 9/2004 | Zoller et al. |
| 5,679,397 A | 10/1997 | Kuroda et al. | 2004/0185469 A1 | 9/2004 | Zoller et al. |
| 5,693,334 A | 12/1997 | Miskewitz | 2004/0191805 A1 | 9/2004 | Adler et al. |
| 5,698,215 A | 12/1997 | Kalili et al. | 2004/0209286 A1 | 10/2004 | Adler et al. |
| 5,702,687 A | 12/1997 | Miskewitz | 2004/0229239 A1 | 11/2004 | Adler et al. |
| 5,713,738 A | 2/1998 | Yarborough | 2004/0238993 A1 | 12/2004 | Benczedi et al. |
| 5,716,601 A | 2/1998 | Rice | 2005/0013915 A1 | 1/2005 | Riha et al. |
| 5,736,175 A | 4/1998 | Cea et al. | 2005/0025721 A1 | 2/2005 | Holme et al. |
| 5,756,074 A | 5/1998 | Ascione et al. | 2005/0032158 A1 | 2/2005 | Adler et al. |
| 5,789,002 A | 8/1998 | Duggan et al. | 2005/0037121 A1 | 2/2005 | Rathjen |
| 5,795,616 A | 8/1998 | Greenberg | 2005/0069944 A1 | 3/2005 | Adler |
| 5,800,848 A | 9/1998 | Yatka et al. | 2005/0084506 A1 | 4/2005 | Tachdjian et al. |
| 5,824,291 A | 10/1998 | Howard | 2005/0084932 A1 | 4/2005 | Zoller et al. |
| 5,869,028 A | 2/1999 | McGill et al. | 2005/0112236 A1 | 5/2005 | Boghani et al. |
| 5,879,728 A | 3/1999 | Graff et al. | 2005/0214348 A1 | 9/2005 | Boghani et al. |
| 5,912,007 A | 6/1999 | Pan et al. | 2005/0220867 A1 | 10/2005 | Boghani et al. |
| 5,912,030 A | 6/1999 | Huzinec et al. | 2005/0260266 A1 | 11/2005 | Gebreselassie et al. |
| 5,939,051 A | 8/1999 | Santalucia et al. | 2005/0287517 A1 | 12/2005 | Adler et al. |

| | | |
|---|---|---|
| 2006/0034897 A1 | 2/2006 | Boghani et al. |
| 2006/0159820 A1 | 7/2006 | Rathjen et al. |
| 2006/0193896 A1 | 8/2006 | Boghani et al. |
| 2006/0263413 A1 | 11/2006 | Boghani et al. |
| 2006/0263472 A1 | 11/2006 | Boghani et al. |
| 2006/0263473 A1 | 11/2006 | Boghani et al. |
| 2006/0263477 A1 | 11/2006 | Boghani et al. |
| 2006/0263478 A1 | 11/2006 | Boghani et al. |
| 2006/0263479 A1 | 11/2006 | Boghani et al. |
| 2006/0263480 A1 | 11/2006 | Boghani et al. |
| 2011/0104329 A1 | 5/2011 | Boghani et al. |
| 2011/0274735 A1 | 11/2011 | Boghani et al. |

FOREIGN PATENT DOCUMENTS

| | | |
|---|---|---|
| DE | 196 53 100 A1 | 7/1998 |
| EP | 0 067 595 | 12/1982 |
| EP | 0 134 120 | 8/1984 |
| EP | 0 132 444 | 2/1985 |
| EP | 0132444 | 2/1985 |
| EP | 201077 A1 | 11/1986 |
| EP | 201078 A1 | 11/1986 |
| EP | 203540 A1 | 12/1986 |
| EP | 0 252 374 | 1/1988 |
| EP | 0 255 260 | 2/1988 |
| EP | 256475 A2 | 2/1988 |
| EP | 0 434 321 | 6/1991 |
| EP | 0 453 397 | 10/1991 |
| EP | 0 608 712 A1 | 8/1994 |
| ES | 2 080 703 | 2/1996 |
| ES | 2 190 875 | 8/2003 |
| GB | 875763 | 8/1961 |
| GB | 1 444 024 | 7/1976 |
| GB | 2 388 581 | 11/2003 |
| JP | 53 136566 A | 11/1978 |
| JP | 02-083030 | 3/1990 |
| JP | 02 227044 | 9/1990 |
| JP | 01/206969 | 7/2001 |
| RO | 85679 | 11/1984 |
| WO | WO 85/03414 | 8/1985 |
| WO | WO 88/00463 | 1/1988 |
| WO | WO 89/03170 | 4/1989 |
| WO | WO 89/11212 | 11/1989 |
| WO | WO 90/04926 | 5/1990 |
| WO | WO 90/07859 | 7/1990 |
| WO | WO 90/12512 | 11/1990 |
| WO | WO 90/13994 | 11/1990 |
| WO | WO 91/07104 | 5/1991 |
| WO | WO 92/02145 | 2/1992 |
| WO | WO 92/06160 | 4/1992 |
| WO | 93/23005 A1 | 11/1993 |
| WO | 93/25177 A1 | 12/1993 |
| WO | WO 95/33034 | 12/1995 |
| WO | WO 96/08166 | 3/1996 |
| WO | WO 96/19193 | 6/1996 |
| WO | WO 97/02009 | 1/1997 |
| WO | WO 97/02011 | 1/1997 |
| WO | WO 98/03076 | 1/1998 |
| WO | WO 98/15192 | 4/1998 |
| WO | WO 98/18339 | 5/1998 |
| WO | WO 98/23165 | 6/1998 |
| WO | WO 98/29088 | 7/1998 |
| WO | 9915032 | 4/1999 |
| WO | WO 99/15032 | 4/1999 |
| WO | WO 99/27798 | 6/1999 |
| WO | WO 99/43294 | 9/1999 |
| WO | WO 99/62354 | 12/1999 |
| WO | 0001253 A1 | 1/2000 |
| WO | WO 00/01253 | 1/2000 |
| WO | WO 00/35296 | 6/2000 |
| WO | WO 00/35298 | 6/2000 |
| WO | WO 00/36924 | 6/2000 |
| WO | 0069282 | 11/2000 |
| WO | WO 00/69282 | 11/2000 |
| WO | WO 00/75274 | 12/2000 |
| WO | WO 01/76384 | 10/2001 |
| WO | WO 02/47489 | 6/2002 |
| WO | WO 02/055649 | 7/2002 |
| WO | WO 02/076231 | 10/2002 |
| WO | 02/087358 A1 | 11/2002 |
| WO | WO 02/000039 | 11/2002 |
| WO | WO 02/102362 | 12/2002 |
| WO | WO 03/063604 | 8/2003 |
| WO | WO 2004/006967 | 1/2004 |
| WO | WO 2004/077956 | 9/2004 |
| WO | WO 2006/003349 | 9/2004 |
| WO | WO 2005/016022 | 2/2005 |
| WO | WO 2005/051427 | 6/2005 |
| WO | WO 2005/079598 | 9/2005 |
| WO | WO 2005/087020 | 9/2005 |
| WO | WO 2005/091918 | 10/2005 |
| WO | WO 2006/079056 | 7/2006 |
| WO | WO 2006/086061 | 8/2006 |
| WO | 2006/127934 A2 | 11/2006 |
| WO | 2006/127935 A1 | 11/2006 |
| WO | 2006/127936 A2 | 11/2006 |
| WO | 2006132057 A1 | 12/2006 |
| WO | 2007/084185 A1 | 7/2007 |
| WO | 2007121599 A1 | 11/2007 |
| WO | 2007121600 A1 | 11/2007 |
| WO | 2007121604 A2 | 11/2007 |

OTHER PUBLICATIONS

Rassing, M.R.; Chewing Gum as a Drug Delivery System: Advanced Drug Delivery Reviews, vol. 13 (1994); No. 1-2, pp. 89-121.
J. Agric. Food Chem. 2004, 52, 8119-8126, Istabel Ovejero-Lopez, Anne-Mette Haahr, Frans Van Den Berg, and Wender L.P. Bredie, Flavor Release Measurement from Gum Model System.
Prencipe et al.; Squeezing out a better toothpaste; Chemtech, Dec. 1995; http://pubs.acs.org/hotartcl/chemtech/95/dec/dec.html; printed Apr. 20, 2004; pp. 1-7.
Gantrez® AN; ISP Polymers for Oral Care; http://www.ispcorp.com/products/oralcare/content/brochure/oral/prod.html, printed Jun. 9, 2004, pp. 1-5.
Aug. 1967, Demmers et al.; Effect of Surfactants and Proteolytic Enzymes on Artificial Calculus Formation; Surfactants and Enzymes; Calculus; pp. 28-35.
Abstract—Cacoveanu et al.; Anti Smoke Composition Tablet Capsule containing propolis extract quinine ascorbic acid vitamin aspartic alpha keto glutaric phosphate calcium glutamate; Nov. 30, 1984. XP-002400514.
Anonymous; "Caprol 3GO CAS No. 9007-48-1" XP002401201. Retrieved from the Internet: URL: http://www.abiteccorp.com/documents/3go-17_000.pdf (retrieved on Sep. 28, 2006).
Anonymous; "HLB Systems" [Online] pp. 1-4, XP002401202. Retrieved from the Internet: URL:http://pharmcal.tripod.com/ch17.htm. (retrieved on Sep. 28, 2006).
R. Deis, "Customizing Sweetness Profiles", retrieved from the internet: www.efenbeonline.com/view_story.asp?type=Story&id.864#, p. 1-4, Oct. 6, 2006.
United States Patent and Trademark Office, Final Office Action dated: Jun. 21, 2010, U.S. Appl. No. 11/500,644, 11 pages.
United States Patent Office, Non Final Office Action dated: Jan. 26, 2009, U.S. Appl. No. 11/439,830.
United States Patent Office, Final Office Action dated: Aug. 17, 2009, U.S. Appl. No. 11/439,830.
United States Patent Office, Non Final Office Action dated: Sep. 29, 2009, U.S. Appl. No. 11/439,830.
U.S. Appl. No. 11/439,832, filed May 23, 2006; Non-Final Office Action dated Jan. 27, 2010 (14 pages).
U.S. Appl. No. 11/500,644, filed Aug. 8, 2006; Non-Final Office Action dated Jan. 25, 2010 (13 pages).
United States Patent Office, Final Office Action, dated: Mar. 11, 2010, U.S. Appl. No. 11/439,830, 25 pages.
International Searching Authority, International Search Report, PCT/US2006/030664, Date of mailing: Feb. 1, 2007, 6 pages.
International Searching Authority, Written Opinion, PCT/US2006/030664, Date of mailing: Feb. 7, 2007, 5 pages.
Non-Final Office Action for U.S. Appl. No. 11/439,811, filed May 23, 2006, Date of Notification Mar. 5, 2009, 11 pages.
Final Office Action for U.S. Appl. No. 11/439,811, filed May 23, 2006, Date of Notification Nov. 30, 2009, 14 pages.

Final Office Action for U.S. Appl. No. 11/439,811, filed May 23, 2006, Date of Notification Jun. 21, 2010, 16 pages.
Non-Final Office Action for U.S. Appl. No. 11/439,811, filed May 23, 2006, Date of Notification Feb. 26, 2010, 14 pages.
Final Office Action for U.S. Appl. No. 12/861,911, filed Aug. 24, 2010, Date of Notification Jan. 23, 2012, 17 pages.
Non-Final Office Action for U.S. Appl. No. 12/861,911, filed Aug. 24, 2010, Date of Notification Jun. 30, 2011, 58 pages.
Final Office Action for U.S. Appl. No. 12/941,344, filed Nov. 8, 2010, Notification Date Jan. 13, 2012, 23 pages.
Non-Final Office Action for U.S. Appl. No. 12/941,344, filed Nov. 8, 2010, Date of Notification Sep. 7, 2011, 12 pages.
Mollee et al., "Stable Reversed Vesicles in Oil: Characterization Studies and Encapsulation of Model Compounds", Journal of Pharmaceutical Sciences, vol. 89, No. 7, 2000, pp. 930-939.
International Search Report for PCT/US2006/020307, International Filing Date May 23, 2006, Date of Mailing Dec. 20, 2006, 11 pages.
Non-Final Office Action for U.S. Appl. No. 12/941,344, filed Nov. 8, 2010, Date of Notification Apr. 26, 2012, 26 pages.
International Preliminary Report on Patentability for International Application No. PCT/US06/20305, International Filing Date May 23, 2006, Date of Mailing Mar. 8, 2012, 8 pages.
International Preliminary Report on Patentability for International Application No. PCT/US06/20306, International Filing Date May 23, 2006, Date of Mailing Mar. 8, 2012, 8 pages.

Effect of Blend Dosage on Sucrose Reduction in Model System

3-Hydroxybenzoic Acid Blends

Blends of 2,4-Dihydroxybenzoic acid, 3-Hydroxybenzoic acid and 3,4-Dihydroxybenzoic acid SEV of Sucrose / Dihydroxybenzoic Acid and Salts (500ppm) Blends

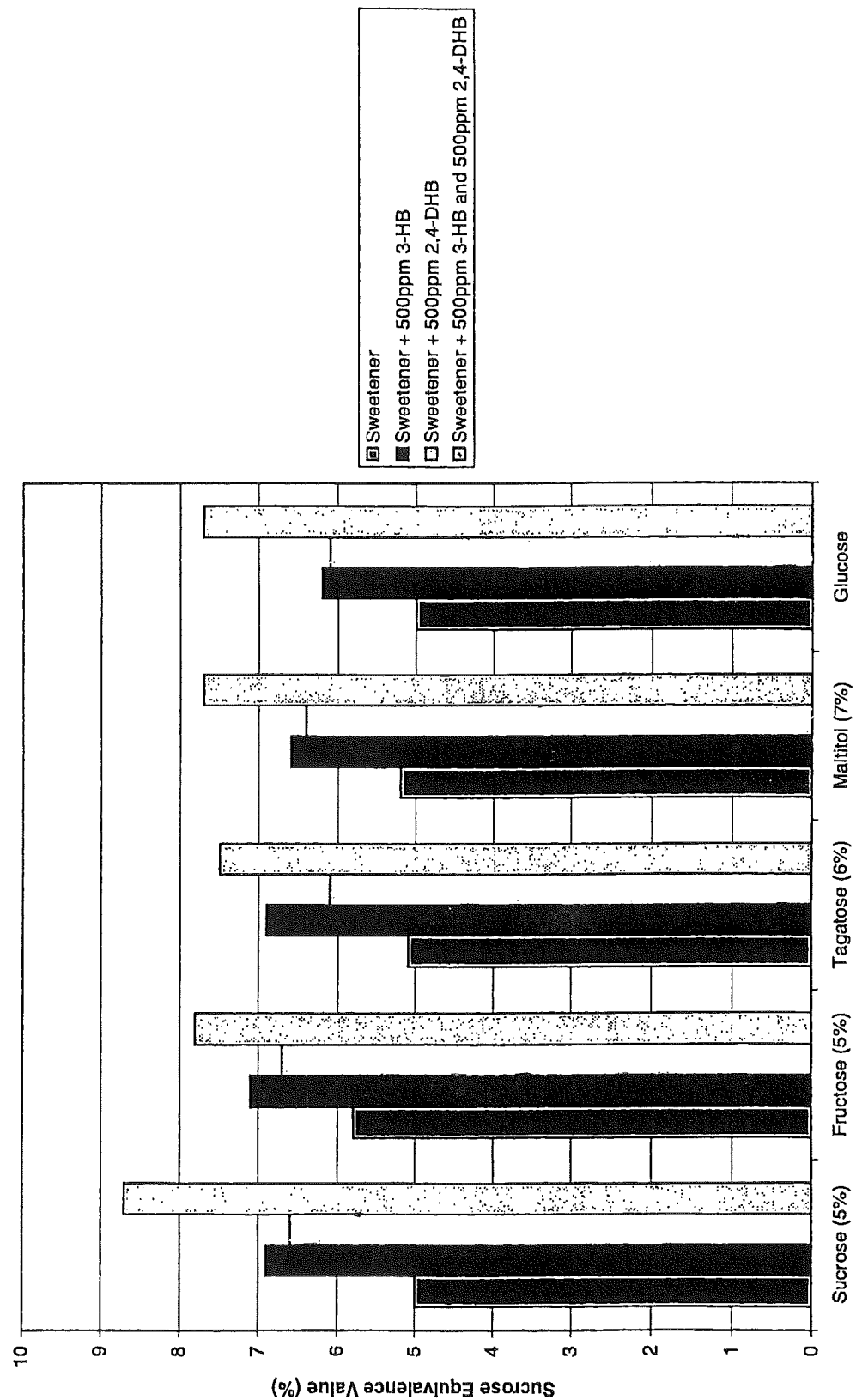

TASTE POTENTIATOR COMPOSITIONS AND EDIBLE CONFECTIONERY AND CHEWING GUM PRODUCTS CONTAINING SAME

CROSS-REFERENCE TO RELATED APPLICATIONS

This application is a division of U.S. patent application Ser. No. 11/439,811, filed May 23, 2006, which claims the benefit of U.S. Provisional Application No. 60/683,634, filed May 23, 2005, U.S. Provisional Application No. 60/760,437, filed Jan. 20, 2006 and U.S. Provisional Application No. 60/789,667, filed Apr. 6, 2006, the contents of which are incorporated herein by reference.

FIELD

The present invention includes oral compositions that provide an enhanced perception of an active substance contained therein. In particular, the compositions may include an active substance, such as a flavor, and a taste potentiator. The taste potentiator may increase the perception of the active substance upon consumption. The compositions may be incorporated into various types of edible orally delivered products, such as confectionery or chewing gum products.

BACKGROUND

There are five primary categories of taste that are sensed by humans: sour, salty, sweet, bitter and umami (savory or the taste of glutamate). The taste of a substance is sensed by taste receptor cells located in taste buds primarily on the surface of the tongue and palate in the oral cavity. Each of the primary taste qualities is sensed by a specific mechanism. It is believed that sour and salty tastes are detected by the passage of ions, hydrogen and sodium respectively, through the ion channels in taste bud cells. This triggers a nerve impulse that is sensed in the brain as sour or salty. In contrast, it is believed that sweet, bitter and umami tastes are perceived by physical binding to receptors. In general, sweet, bitter and umami sensing taste cells have G-protein coupled receptors (GPCRs) on their surface. These receptors are activated when they bind to tastants, which initiates a series of signaling events that trigger a nerve impulse that is sensed in the brain as sweet, bitter or savory.

Over the past several years, there have been a number of advances in research on taste perception. New taste receptor proteins have been identified in mammals, particularly two families of G-protein coupled receptors (T2Rs and T1Rs), which are believed to be involved in taste perception. Such receptors are discussed in more detail in International Publication Nos. WO 02/064631 and WO 03/001876. These publications disclose that co-expression of certain T1R receptors results in savory or sweet taste receptors that respond to savory or sweet taste stimuli, respectively.

Recent advances in the understanding of taste perception have created interest in identifying new compounds for stimulating these taste receptors. In particular, research efforts also have been directed to methods of identifying compounds that may enhance the primary taste perceptions, such as sweet or savory perceptions. The development of substances that provide flavor enhancement is of particular interest, and such substances are generally referred to as taste or flavor enhancers, or potentiators. These substances have been thought to contribute taste, aroma and feeling factors, as well as potentiate and suppress other flavors. The activity of taste or flavor enhancers is often referred to as synergistic because they enhance or increase the perception of another substance.

One category of taste potentiators of particular interest is compounds that enhance sweetness. Although naturally occurring carbohydrate sweeteners, such as sucrose, are the most widely used sweeteners, they suffer from the disadvantages of high cost and high caloric content. Artificial sweeteners have been designed that overcome these problems but they are sometimes rejected by the consumer for not having a sufficiently "sucrose-like" taste. Artificial sweeteners have different sweetness profiles from that of sucrose and often suffer from side effects such as delays in the onset of sweetness perception and/or unpleasant aftertastes.

Compounds are known which, when combined with a sweetener, modify the taste of the sweetener. Such compounds are usually referred to as sweetness modifiers or potentiators. They may act to enhance or inhibit the perception of the sweetness of the sweetener or may affect the sweetness profile in some way. For example, Canadian Patent No. 1208966 discloses a broad range of aromatic compounds which are claimed as sweetness modifiers.

European Patent No. 0132444 and U.S. Pat. No. 4,627,987 describe 3-hydroxybenzoic acid (3-HB) as a sweetness potentiator and exemplify its use with sucrose, aspartame and saccharin to enhance sweetness when employed at pH 2.0 to 5.5.

2,4-Dihydroxybenzoic acid (2,4-DHB) also is described as a sweetness potentiator, but the literature is ambiguous as to its effects. In U.S. Pat. No. 5,232,735 it is listed as a "substantially tasteless sweetness inhibitor" whereas in Canadian Patent No. 1208966 the addition of 0.2% 2,4-DHB to a 5% sucrose solution is said to have resulted in an increase in sweetness. International Publication No. WO99/15032 describes the use of 2,4-DHB with aspartame to increase sweetness synergistically and provide a more "sucrose-like" taste and mouthfeel. The combination is considered peculiar, in that the same effect is not observed when 2,4-DHB is combined with the alternative artificial sweeteners, alitame, Ace-K (acesulfame potassium), saccharin or even a mixture of aspartame and Ace-K. U.S. Pat. No. 6,461,658 claims that 2,4-DHB improves the sweetness delivery profile of the artificial sweetener sucralose by significantly reducing the length of time during which sucralose sweetness is perceived. The same effect is not observed for aspartame even though this might be expected in light of International Publication No. WO99/15032. FIGS. 1 and 2 and Tables 1 and 2 of U.S. Pat. No. 6,461,658 seem to indicate that 2,4-DHB has a slightly inhibitory effect on the sweetness intensity of both sucralose and aspartame although this is not discussed in the text.

International Publication No. WO00/69282 describes the modification of the taste and physicochemical properties of the sweetener neotame by the addition of at least one taste modifying hydrophobic acid additive. The taste modifying hydrophobic acid additive is limited only in that it must positively affect at least one taste characteristic imparted by neotame. These characteristics appear to be related to the sweetness profile, specifically the onset and linger period, but the examples do not describe how the characteristics have been affected. 3-HB and 2,4-DHB are listed among a very large number of such additives.

Additionally, there have been a number of recent developments related to methods of identifying substances that function as taste potentiators. Various assays have been developed to identify target compounds that modulate the activity of taste receptors, and thus, may become successful taste potentiators. For example, International Publication Nos. WO 02/064631 and WO 03/001876, referred to above, disclose assays and high-throughput screens that measure certain T1R receptor activity in the presence of target compounds.

U.S. Pat. No. 6,955,887 to Adler et al. discloses methods for identifying taste potentiators using newly identified mammalian taste-cell-specific G-protein coupled receptors. More specifically, U.S. Pat. No. 6,955,887 teaches methods for screening target compounds that may be used to modulate the sweet taste perception.

Various other methods for screening compounds that may be used as taste potentiators are disclosed in the U.S. Patent Publication Nos. 2005/0287517A1, 2005/0084932A1, 2005/0069944A1, 2005/0032158A1, 2004/0229239A1, 2004/0209286A1, 2004/0191805A1, 2004/0185469A1, 2004/0175793A1, 2004/0175792A1, 2004/0171042A1, 2004/0132075A1, 2004/0072254A1, 2003/0232407A1, 2003/0170608A1 and 2003/0054448A1.

Despite progress in developing methods for identifying new taste potentiators, there is still a need for oral, particularly confectionery, compositions that include such taste potentiators. Further, there is a need for compositions that control the release rate of the taste potentiator from the composition. In particular, there is a need for chewing gums and other related confectioneries that control the release profile of taste potentiators, as desired, to manage the release profile of the chewing gum or confectionery product. Moreover, it would be desirable to develop a sweetener potentiator composition that allows the quantity of natural or artificial sweetener in an orally delivered product to be reduced, thereby reducing the cost of production and the calorie content of the orally delivered product, but which avoids adverse effects on flavor.

SUMMARY

In some embodiments there is a controlled-release composition including at least one active substance and at least one encapsulated taste potentiator.

In some embodiments there is a controlled-release composition including an encapsulated mixture of at least one taste potentiator and at least one active substance.

In some embodiments there is a controlled-release composition including at least one encapsulated active substance and at least one taste potentiator.

In some embodiments there is a controlled-release composition including at least one active substance and at least one taste potentiator.

In some embodiments, a controlled-release composition includes at least one encapsulated active substance and at least one encapsulated taste potentiator.

In some embodiments there is a controlled-release composition including at least one intense sweetener and at least one encapsulated sweetener potentiator.

In some embodiments there is a composition including at least one active substance and at least one encapsulated taste potentiator.

In some embodiments there is a composition including an encapsulated mixture of at least one taste potentiator and at least one active substance.

In some embodiments there is a composition including at least one encapsulated active substance and at least one taste potentiator.

In some embodiments there is a composition including at least one active substance and at least one taste potentiator.

In some embodiments there is a composition including at least one encapsulated active substance and at least one encapsulated taste potentiator.

In some embodiments there is a composition including at least one intense sweetener and at least one encapsulated sweetener potentiator.

In some embodiments there is a composition that modulates the activity of taste receptor cells in a mammal, which includes at least one active substance and at least one encapsulated taste potentiator, wherein the at least one encapsulated taste potentiator acts in conjunction with the at least one active substance to modulate the activity of the taste receptor cells upon consumption of the composition, thereby enhancing the perception of the at least one active substance.

Some embodiments provide a sweetener potentiator composition, which includes a first amount of 3-hydroxybenzoic acid and a second amount of 2,4-dihydroxybenzoic acid, wherein the first amount is equal to the second amount.

In some embodiments, there is a sweetener potentiator composition, including a first amount of 3-hydroxybenzoic acid and a second amount of 2,4-dihydroxybenzoic acid, wherein the sweetener potentiator composition contains sufficient amounts of the first amount of 3-hydroxybenzoic acid and the second amount of 2,4-dihydroxybenzoic acid to create a sucrose equivalent value of at least seven %.

In some embodiments, there is a sweetener potentiator composition, which includes a first amount of 3-hydroxybenzoic acid and a second amount of 2,4-dihydroxybenzoic acid, wherein the sweetener potentiator composition contains sufficient amounts of the first amount of 3-hydroxybenzoic acid and the second amount of 2,4-dihydroxybenzoic acid to create a sucrose equivalent value of at least eight %.

Some embodiments provide a sweetener potentiator composition, which includes a first amount of 3-hydroxybenzoic acid and a second amount of 2,4-dihydroxybenzoic acid, wherein the sweetener potentiator composition contains at least 200 ppm of the first amount of 3-hydroxybenzoic acid and at least 200 ppm of the second amount of 2,4-dihydroxybenzoic acid.

Some embodiments provide a sweetener potentiator composition, including a first amount of 3-hydroxybenzoic acid and a second amount of 2,4-dihydroxybenzoic acid, wherein the sweetener potentiator composition contains at least 400 ppm of the first amount of 3-hydroxybenzoic acid and at least 400 ppm of the second amount of 2,4-dihydroxybenzoic acid.

Some embodiments provide a sweetener potentiator composition, including a first amount of 3-hydroxybenzoic acid and a second amount of 2,4-dihydroxybenzoic acid, wherein the sweetener potentiator composition contains at least 500 ppm of the first amount of 3-hydroxybenzoic acid and at least 500 ppm of the second amount of 2,4-dihydroxybenzoic acid.

Some embodiments provide a sweetener potentiator composition, which includes a first amount of 3-hydroxybenzoic acid and a second amount of 2,4-dihydroxybenzoic acid, wherein the sweetener potentiator composition contains a ratio by weight of the first amount of 3-hydroxybenzoic acid to the second amount of 2,4-dihydroxybenzoic acid between 1:9 and 9:1.

In some embodiments, there is a sweetener potentiator composition, which includes a first amount of 3-hydroxybenzoic acid and a second amount of 2,4-dihydroxybenzoic acid, wherein the sweetener potentiator composition is in a form of a blended powder.

Some embodiments provide a sweetener potentiator composition, including a first amount of 3-hydroxybenzoic acid, a second amount of 2,4-dihydroxybenzoic acid and a third amount of 3,4-dihydroxybenzoic acid.

In some embodiments there is a chewing gum composition, which includes:
(a) a gum base; and
(b) a composition including:
(i) at least one active substance; and
(ii) at least one encapsulated taste potentiator.

In some embodiments there is a chewing gum composition including:
(a) a gum base;
(b) at least one bulk sweetener;
(c) a composition including:
(i) at least one active substance; and
(ii) at least one encapsulated taste potentiator; and
(d) optionally at least one flavor.

In some embodiments there is a chewing gum composition including:
(a) a gum base; and
(b) a composition including:
(i) at least one active substance having a first solubility; and
(ii) at least one taste potentiator having a second solubility,
wherein the first and second solubilities provide a controlled-release profile to the chewing gum composition selected from simultaneous release, sequential release and partially overlapping release.

In some embodiments there is a chewing gum composition including:
(a) a gum base; and
(b) a composition comprising an encapsulated mixture of at least one taste potentiator and at least one active substance.

In some embodiments there is a chewing gum composition including:
(a) a gum base; and
(b) a composition including:
(i) at least one encapsulated active substance; and
(ii) at least one taste potentiator.

In some embodiments a chewing gum composition includes:
(a) a gum base; and
(b) a composition including:
(i) at least one active substance; and
(ii) at least one taste potentiator.

In some embodiments there is a chewing gum composition including:
(a) a gum base; and
(b) a composition including:
(i) at least one encapsulated active substance; and
(ii) at least one encapsulated taste potentiator.

In some embodiments there is a chewing gum composition including:
(a) a gum base; and
(b) a composition including:
(i) at least one intense sweetener; and
(ii) at least one encapsulated sweetener potentiator.

Some embodiments provide a chewing gum composition including:
(a) a gum base; and
(b) a sweetener potentiator composition further including:
(i) a first amount of 3-hydroxybenzoic acid, and
(ii) a second amount of 2,4-dihydroxybenzoic acid.

Some embodiments provide a chewing gum composition including:
(a) a gum base;
(b) at least one bulk sweetener; and
(c) a sweetener potentiator composition further containing:
(i) a first amount of 3-hydroxybenzoic acid, and
(ii) a second amount of 2,4-dihydroxybenzoic acid.

In some embodiments, there is a confectionery composition including a sweetener potentiator composition, the sweetener potentiator composition including a first amount of 3-hydroxybenzoic acid and a second amount of 2,4-dihydroxybenzoic acid, wherein the first amount is equal to the second amount.

In some embodiments, there is a confectionery composition including a sweetener potentiator composition, the sweetener potentiator composition including a first amount of 3-hydroxybenzoic acid and a second amount of 2,4-dihydroxybenzoic acid.

Some embodiments provide a confectionery composition including:
(a) a confectionery base; and
(b) a sweetener potentiator composition further containing:
(i) a first amount of 3-hydroxybenzoic acid, and
(ii) a second amount of 2,4-dihydroxybenzoic acid.

In some embodiments, there is a method of reducing the cost of a sweetener system including the steps of:
(a) determining an amount of natural or artificial sweetener in an orally delivered product that provides a desired sweetness intensity;
(b) reducing the amount of natural or artificial sweetener; and
(c) adding a quantity of a sweetener potentiator composition including 3-hydroxybenzoic acid and 2,4-dihydroxybenzoic acid such that the desired sweetness intensity is maintained.

Some embodiments provide a method of maintaining a desired sweetness intensity in an orally delivered product including the steps of:
(a) determining a desired sweetness intensity;
(b) adding a quantity of natural or artificial sweetener that supplies a sweetness intensity less intense than the desired sweetness intensity; and
(c) adding a quantity of a sweetener potentiator composition including 3-hydroxybenzoic acid and 2,4-dihydroxybenzoic acid such that the desired sweetness intensity is delivered.

Some embodiments provide a method of increasing the sweetness intensity of an orally delivered product including the steps of:
(a) adding a quantity of natural or artificial sweetener to an orally delivered product;
(b) determining a sweetness intensity derived from the quantity of the natural or artificial sweetener; and
(c) adding a quantity of a sweetener potentiator composition including 3-hydroxybenzoic acid and 2,4-dihydroxybenzoic acid such that the sweetness intensity is greater than the sweetness intensity derived from the natural or artificial sweetener.

Some embodiments provide a method of reducing the amount of natural or artificial sweeteners in an orally delivered product including the steps of:
(a) determining an amount of natural or artificial sweetener in an orally delivered product that provides a desired sweetness intensity;
(b) reducing the amount of natural or artificial sweetener; and
(c) adding a quantity of a sweetener potentiator composition including 3-hydroxybenzoic acid and 2,4-dihydroxybenzoic acid such that the desired sweetness intensity is maintained.

In some embodiments, a method of preparing a chewing gum product includes the steps of:
(a) mixing at least one encapsulant and at least one taste potentiator to form a dispersion of the components;

(b) forming a plurality of encapsulated taste potentiator particles from the mixture;

(c) adding the encapsulated particles to a chewing gum composition to enhance the perception of at least one active substance contained therein, wherein the chewing gum composition contains a gum base and at least one active substance; and (d) forming individual pieces of chewing gum from the chewing gum composition.

In some embodiments there is a method of preparing a taste potentiator composition having controlled-release upon consumption, which includes the steps of:

(a) providing at least one taste potentiator;

(b) mixing the at least one taste potentiator with at least one encapsulant to form a composition having a dispersion of the components; and (c) forming a plurality of encapsulated taste potentiator particles from the composition, thereby modifying the release rate of the at least one taste potentiator upon consumption of the composition.

In some embodiments there is a method of controlling the release of a composition, which includes the steps of:

(a) providing at least one active substance having a first solubility; and (b) adding at least one taste potentiator having a second solubility, wherein the first and second solubilities are selected to impart a controlled-release profile to the composition selected from simultaneous release, sequential release and partially overlapping release.

BRIEF DESCRIPTION OF THE DRAWINGS

FIG. 10 is a bar chart of perceived sweetness for solutions containing bulk sweeteners.

DETAILED DESCRIPTION

Figure 1:
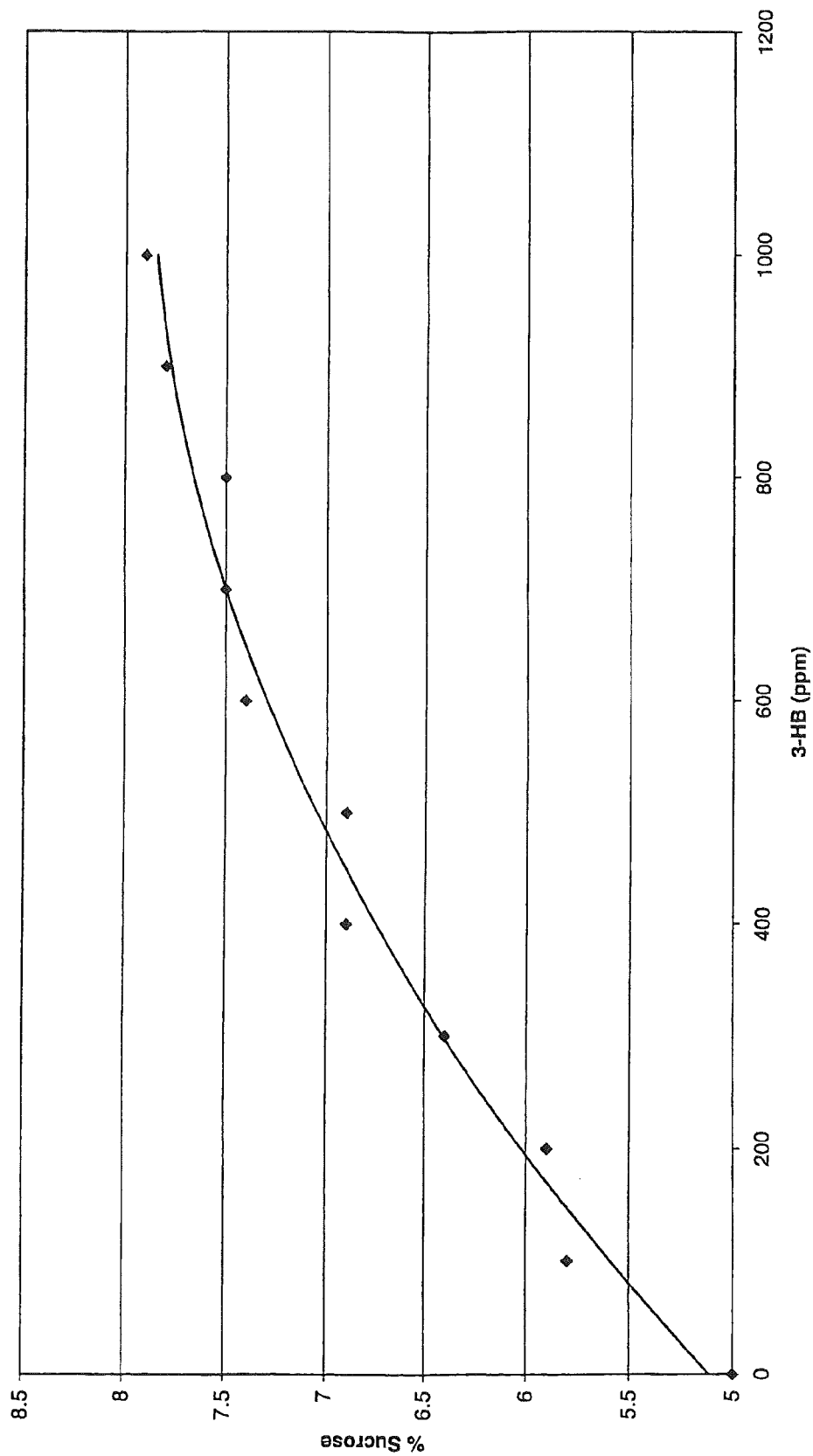
FIG. 1 is a graph of 3-hydroxybenzoic acid concentration against perceived sweetness.

As used herein the transitional term "comprising," (also "comprises," etc.) which is synonymous with "including," "containing," or "characterized by," is inclusive or open-ended and does not exclude additional, unrecited elements or method steps, regardless of its use in the preamble or the body of a claim.

As used herein, the terms "bubble gum" and "chewing gum" are used interchangeably and are both meant to include any gum compositions.

As used herein, the term "confectionery base" includes any ingredient or group of ingredients that represent form the bulk of the confectionery composition and provide the confectionery composition with its structural integrity and to which other ingredients are added.

The term "flavor key" as used herein is a flavor component containing flavoring agents such as flavored oils, and the like, and is typically used to prepare a flavor essence.

The term "flavor essence" ("flavor blend", "flavor extract") as used herein is a flavor component generally prepared from a flavor key.

Embodiments described herein provide compositions for oral delivery of an active substance. Numerous different active substances may be employed, such as, for example, flavors. The compositions also may include a taste potentiator. The taste potentiator may act in a synergistic manner when used in conjunction with the active substance to enhance the perception of the active substance during consumption. Additionally, in some embodiments, the taste potentiator may be encapsulated to provide a controlled release profile, i.e., delayed or increased rate of release upon consumption. The taste potentiator accordingly may release over an extended period of time throughout the consumption of the product into which the composition is incorporated, such as, for example, chewing gum.

Potentiator Compositions

Embodiments described herein provide compositions that may include at least one active substance and at least one taste potentiator. The potentiator compositions may have controlled-release properties. The taste potentiator(s) may work synergistically with the active substance(s) to enhance the perception of the active(s). For instance, in some embodiments, the active substance may be a sweetener. Delivery of the sweetener in combination with at least one taste potentiator may enhance the sweet taste upon consumption of the composition. In particular, the taste potentiator(s) may function synergistically with the sweetener to enhance the sweet taste. The incorporation of the potentiator(s), therefore, allows for reduced amounts of sweetener without compromising the level of sweetness provided by the composition. Due to the calories contained in many conventional sweeteners, such as sugar, these results may be highly desirable. Additionally, there may be significant cost savings associated with the reduction in sweetener amounts used in the composition.

For purposes of some embodiments described herein, "taste potentiator" refers to substances that may enhance the perception of an active substance during consumption of the composition. For purposes of some embodiments described herein, the term "enhance" means to intensify, supplement, modify, modulate or potentiate. Some taste potentiators may be referred to more specifically by reference to the type of active they enhance. For example, sweetener (or sweetness) potentiators enhance the perception of a sweetener during consumption and flavor potentiators enhance the perception of a flavor during consumption. These more specific examples, however, are merely subsets of taste potentiators and are encompassed by the general term "taste potentiator" as used herein.

Taste potentiators may have a synergistic effect when used in conjunction with an active, i.e., by enhancing the taste effects of the active substance such that the total effect is greater than the sum of the taste effects of the individual substances alone. In addition, some taste potentiators do not introduce a characteristic taste and/or aroma perception of their own.

In some embodiments, for instance, the taste potentiator(s) may enhance the sour, sweet, bitter, salty or umami taste of a composition. The taste potentiator(s) also may function to enhance the effects of a variety of other active substances, as discussed in more detail below.

Any of a variety of known substances that function as taste potentiators may be employed in the compositions described herein. For instance, suitable taste potentiators include water-soluble taste potentiators, such as, but not limited to, neohesperidin dihydrochalcone, chlorogenic acid, alapyridaine, cynarin, miraculin, glupyridaine, pyridinium-betain compounds, glutamates, such as monosodium glutamate and monopotassium glutamate, neotame, thaumatin, tagatose, trehalose, salts, such as sodium chloride, monoammonium glycyrrhizinate, vanilla extract (in ethyl alcohol), water-soluble sugar acids, potassium chloride, sodium acid sulfate, water-soluble hydrolyzed vegetable proteins, water-soluble hydrolyzed animal proteins, water-soluble yeast extracts, adenosine monophosphate (AMP), glutathione, water-soluble nucleotides, such as inosine monophosphate, disodium inosinate, xanthosine monophosphate, guanylate monophosphate, alapyridaine (N-(1-carboxyethyl)-6-(hydroxymethyl)pyridinium-3-ol inner salt, sugar beet extract (alcoholic extract), sugarcane leaf essence (alcoholic extract), curculin, strogin, mabinlin, gymnemic acid, 2-hydroxybenzoic acid (2-HB), 3-hydroxybenzoic acid (3-HB), 4-hydroxybenzoic acid (4-HB), 2,3-dihydroxybenzoic acid (2,3-DHB), 2,4-dihydroxybenzoic acid (2,4-DHB), 2,5-dihydroxybenzoic acid (2,5-DHB), 2,6-dihydroxybenzoic acid (2,6-DHB), 3,4-dihydroxybenzoic acid (3,4-DHB), 3,5-dihydroxybenzoic acid (3,5-DHB), 2,3,4-trihydroxybenzoic acid (2,3,4-THB), 2,4,6-trihydroxybenzoic acid (2,4,6-THB), 3,4,5-trihydroxybenzoic acid (3,4,5-THB), 4-hydroxyphenylacetic acid, 2-hydroxyisocaproic acid, 3-hydroxycinnamic acid, 3-aminobenzoic acid, 4-aminobenzoic acid and combinations thereof.

Other suitable taste potentiators are substantially or completely insoluble in water, such as, but not limited to, citrus aurantium, vanilla oleoresin, water insoluble sugar acids, water insoluble hydrolyzed vegetable proteins, water insoluble hydrolyzed animal proteins, water insoluble yeast extracts, insoluble nucleotides, sugarcane leaf essence and combinations thereof.

Some other suitable taste potentiators include substances that are slightly soluble in water, such as, but not limited to, maltol, ethyl maltol, vanillin, slightly water-soluble sugar acids, slightly water-soluble hydrolyzed vegetable proteins, slightly water-soluble hydrolyzed animal proteins, slightly water-soluble yeast extracts, slightly water-soluble nucleotides and combinations thereof.

Additional suitable taste potentiators include, but are not limited to, licorice glycyrrhizinates, compounds that respond to G-protein coupled receptors (T2Rs and T1Rs), G-protein coupled receptors (T2Rs and T1Rs) and taste potentiator compositions that impart kokumi, as disclosed in U.S. Pat. No. 5,679,397 to Kuroda et al., which is incorporated in its entirety herein by reference. "Kokumi" refers to materials that impart "mouthfulness" and "good body". Kokumi imparting compositions may be water-soluble, slightly water-soluble or insoluble in water.

As mentioned above, sweetener potentiators, which are a type of taste potentiator, enhance the taste of sweetness. Exemplary sweetener potentiators include, but are not limited to, monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, sugar beet extract, neotame, thaumatin, neohesperidin dihydrochalcone, tagatose, trehalose, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs), 2-hydroxybenzoic acid (2-HB), 3-hydroxybenzoic acid (3-HB), 4-hydroxybenzoic acid (4-HB), 2,3-dihydroxybenzoic acid (2,3-DHB), 2,4-dihydroxybenzoic acid (2,4-DHB), 2,5-dihydroxybenzoic acid (2,5-DHB), 2,6-dihydroxybenzoic acid (2,6-DHB), 3,4-dihydroxybenzoic acid (3,4-DHB), 3,5-dihydroxybenzoic acid (3,5-DHB), 2,3,4-trihydroxybenzoic acid (2,3,4-THB), 2,4,6-trihydroxybenzoic acid (2,4,6-THB), 3,4,5-trihydroxybenzoic acid (3,4,5-THB), 4-hydroxyphenylacetic acid, 2-hydroxyisocaproic acid, 3-hydroxycinnamic acid, 3-aminobenzoic acid, 4-aminobenzoic acid and combinations thereof.

Additional taste potentiators for the enhancement of salt taste include acidic peptides, such as those disclosed in U.S. Pat. No. 6,974,597, herein incorporated by reference. Acidic peptides include peptides having a larger number of acidic amino acids, such as aspartic acid and glutamic acid, than basic amino acids, such as lysine, arginine and histidine. The acidic peptides are obtained by peptide synthesis or by subjecting proteins to hydrolysis using endopeptidase, and if necessary, to deamidation. Suitable proteins for use in the production of the acidic peptides or the peptides obtained by subjecting a protein to hydrolysis and deamidation include plant proteins, (e.g. wheat gluten, corn protein (e.g., zein and gluten meal), soybean protein isolate), animal proteins (e.g., milk proteins such as milk casein and milk whey protein, muscle proteins such as meat protein and fish meat protein, egg white protein and collagen), and microbial proteins (e.g., microbial cell protein and polypeptides produced by microorganisms).

The sensation of warming or cooling effects may also be prolonged with the use of a hydrophobic sweetener as described in U.S. Patent Publication No. 2003/0072842 A1, which is incorporated in its entirety herein by reference. For example, such hydrophobic sweeteners include those of the formulae I-XI as set forth below:

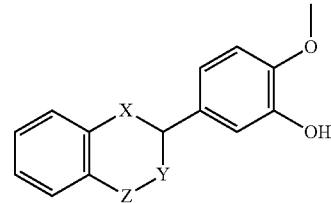

I wherein X, Y and Z are selected from the group consisting of $CH_2$, O and S;

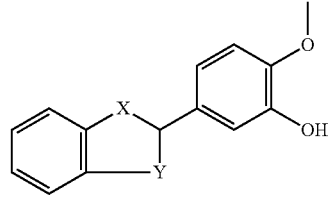

II wherein X and Y are selected from the group consisting of S and O;

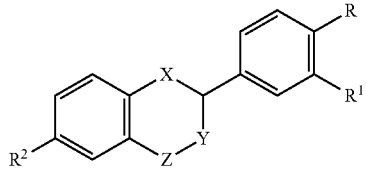
III wherein X is S or O; Y is O or CH$_2$; Z is CH$_2$, SO$_2$ or S; R is OCH$_3$, OH or H; R$^1$ is SH or OH and R$^2$ is H or OH;

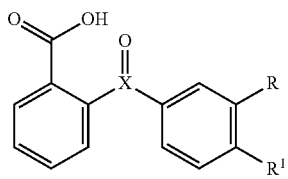
IV wherein X is C or S; R is OH or H and R' is OCH$_3$ or OH;

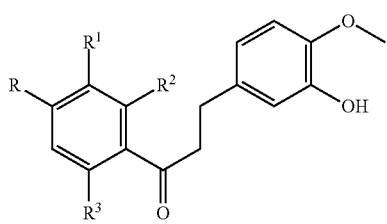
V wherein R, R$^2$ and R$^3$ are OH or H and R' is H or COOH;

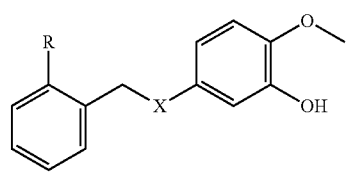
VI wherein X is O or CH$_2$ and R is COOH or H;

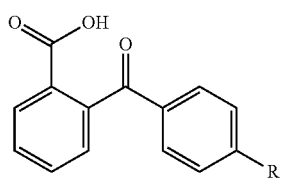
VII wherein R is CH$_3$CH$_2$, OH, N(CH$_3$)$_2$ or Cl;

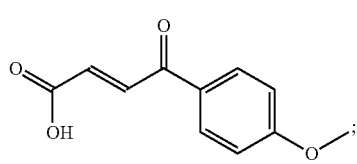
VIII

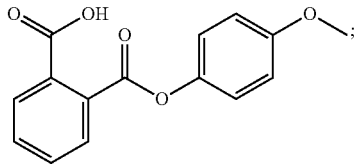
IX

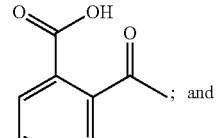
X and

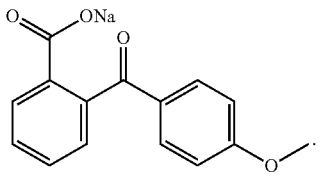
XI

Perillartine may also be added as described in U.S. Pat. No. 6,159,509 also incorporated in its entirety herein by reference.

Any of the above-listed taste potentiators may be used alone or in combination.

Some embodiments, for instance, may include two or more taste potentiators that act synergistically with one another. For instance, in some embodiments, a sweetener potentiator composition may be provided, which includes two or more sweetener potentiators that act synergistically with one another. The sweetener potentiator composition may enhance the sweetness of products into which it is incorporated by reducing the amount of sucrose needed to provide a sweetness intensity equivalent to sucrose. The sweetness enhancing effect of the combination of sweetener potentiators may be greater than the effect of either compound used individually.

More specifically, according to some embodiments, there is provided a sweetener potentiator composition comprising 3-hydroxybenzoic acid (3-HB) and 2,4-dihydroxybenzoic acid (2,4-DHB) or comestible salts thereof.

Comestible salts include acid (i.e. carboxylate) salts and/or hydroxylate salts, especially sodium, potassium, calcium, magnesium, and ammonium salts and the like. Desirably, in some embodiments, the sweetener potentiator composition employs 3-HB and/or 2,4-DHB in the form of the acid, the sodium salt or the potassium salt.

Although 3-HB and 2,4-DHB have been studied individually, they have not been used in combination. The inventors have discovered that a surprisingly large sweetness enhancing effect is observed when both compounds are employed in combination with a sweetener. This effect is greater than would be predicted by the use of either compound individually.

In particular, in some embodiments, sufficient amounts of 3-HB and 2,4-DHB are employed in the sweetener potentiator compositions to create a sucrose equivalent value of at least about seven %, more specifically, at least about eight %.

In general, 3-HB and 2,4-DHB may be used in amounts of about 200 ppm, 400 ppm or 500 ppm. 3-HB and 2,4-DHB may be incorporated into sweetener potentiator compositions in equal or different amounts.

In some embodiments, the sweetener potentiator composition contains 3-HB and 2,4-DHB in a ratio by weight of from 1:9 to 9:1, more specifically from 2:8 to 8:2, even more specifically from 4:6 to 6:4 and most specifically 1:1.

The sweetener potentiator composition may contain a further sweetener potentiator. For instance, 3,4-dihydroxybenzoic acid (3,4-DHB) or its comestible salt may be employed.

In some embodiments, the sweetener potentiator composition may be provided as a pre-blended powder or liquid, which may be added to another composition, whereas in other embodiments, the individual components of the sweetener potentiator composition may be added to another composition as individual ingredients.

In some embodiments, it may be desirable to control the release rate of the taste potentiator(s) from the compositions, as well as the overall release profile of the compositions themselves. Different release rates may be desired depending on the type of final product in which the composition is being incorporated and the consumption time thereof. For instance, chewing gum products may have different chew profiles, ranging anywhere from about 15 to about 120 minutes. Depending upon the chewing gum selected, different release rates will be desired. Other confectionery formats, such as hard candy, including nougats, caramels, frappes and taffies, also may have different release rates.

In some embodiments, the release rate may be based on the solubility of the taste potentiator(s) in water. Selection of a specific solubility may be used to control the release profile of the taste potentiator(s), as well as the overall composition. More specifically, taste potentiators have varying solubilities in water. Although some of these components are water-soluble, i.e., capable of being substantially or completely dissolvable in water, others exhibit poor or no solubility in water. In some embodiments, for instance, it may be desirable to select one or more taste potentiators that have low water-solubility in combination with an active known to exhibit poor solubility in water. The highly insoluble taste potentiator thereby may last throughout consumption of the composition as the active substance also slowly releases therefrom. Alternatively, a relatively highly water-soluble potentiator may be paired with a relatively highly water-soluble active substance. In both of these instances, the taste potentiator and active substance may be selected based on solubilities such that their release profiles are similar or overlap.

In other embodiments, for example, it may be desirable to select several taste potentiators that have different solubilities in water such that the potentiators may release sequentially from the composition. Another example may include multiple sequentially releasing taste potentiators with multiple active substances also having different solubilities in water. Numerous other combinations of taste potentiators having different solubilities also may be used to provide different release profiles for the compositions. In view thereof, the solubility of the taste potentiator(s), as well as the combination thereof with the active(s), may be used to control and tailor the release profile of the overall composition.

For purposes of some embodiments described herein, therefore, the term "controlled-release" means that the duration or manner of release is managed or modified to some degree to provide a desired release profile. More specifically, for example, controlled-release includes at least the following release profiles: delayed onset of release; pulsed release; gradual release; high initial release; sustained release; sequential release; and combinations thereof.

Taste potentiators and active substances having different solubilities and/or release profiles may be combined in numerous different embodiments to provide compositions having many different overall release profiles. For example, one or more taste potentiators having any of the following release profiles may be combined in any manner with one or more active substances having any of the following release profiles: delayed onset of release ("DOR"); pulsed release ("PR"); gradual release ("GR"); high initial release ("HIR"); and sustained release ("SUR"). Moreover, other techniques of imparting these, as well as other controlled-release profiles to taste potentiators and/or active substances may be employed. For instance, encapsulation techniques, which are discussed in more detail below, may be used. Additionally, taste potentiator(s) and active substance(s) that are not encapsulated (sometimes referred to as "free" components) may be combined with other forms of the components, such as encapsulated forms, to tailor the release profile of the potentiator compositions. A sampling of hypothetical combinations is provided in Table 1 below, wherein $P_1$-$P_3$ represent different taste potentiators and $A_1$-$A_3$ represent different active substances. $P_1$-$P_3$ and $A_1$-$A_3$ may be used in their free and/or encapsulated forms.

TABLE 1

| Hypothetical Combinations | $P_1$ | $P_2$ | $P_3$ | $A_1$ | $A_2$ | $A_3$ |
|---|---|---|---|---|---|---|
| 1 | GR | HIR | | GR | HIR | |
| 2 | | GR | HIR | | GR | HIR |
| 3 | PR | SUR | GR | PR | SUR | GR |
| 4 | | PR | SUR | | PR | SUR |
| 5 | HI | | PR | HI | | PR |
| 6 | DOR | HIR | | DOR | HIR | |
| 7 | | DOR | HIR | | DOR | HIR |
| 8 | | | DOR | PR | | DOR |
| 9 | SUR | HIR | | | PR | |
| 10 | | SUR | HIR | | | PR |

Controlled-release properties also may be imparted to the compositions described herein in other manners, such as, for example, by encapsulation techniques, as mentioned above. Encapsulation may be used to impart any of the various release profiles discussed above. In some embodiments, the taste potentiator(s) and/or active substance(s) may be encapsulated to control the rate of release of the potentiator and/or active from the composition. For example, in some embodiments, 3-HB and/or 2,4-DHB may be used in their encapsulated forms.

For instance, some embodiments may include at least one encapsulated taste potentiator and at least one unencapsulated active, i.e., in its free form. Other embodiments may include at least one unencapsulated taste potentiator and at least one encapsulated active substance. Further, in some embodiments, both the taste potentiator(s) and active substance(s) may be encapsulated. In such embodiments, the taste potentiator(s) and active substance(s) may be encapsulated together or separately. In embodiments in which the taste potentiator(s) and active substance(s) are encapsulated separately, the material used to encapsulate the components may be the same or different. Furthermore, in any of these embodiments, more than one material may be used to encapsulate the taste potentiator(s) or the active substance(s).

In any of the embodiments mentioned above, the encapsulated form of the taste potentiator(s) or active substance(s) may be used in combination with an amount of the same component in its free, i.e., unencapsulated, form. By using both the free component and the encapsulated component, the enhanced perception of the active may be provided over a longer period of time and/or perception of the active by a consumer may be improved. For instance, some embodiments may include a taste potentiator that is encapsulated in combination with an amount of the same taste potentiator in its unencapsulated form. Alternatively, the unencapsulated taste potentiator could be a different taste potentiator from the potentiator that is encapsulated. Thereby, a mixture of two different taste potentiators may be included in some embodiments, one of which is encapsulated and the other in its free form. These variations also may be employed with respect to the active substance(s).

Encapsulation may be effected by dispersion of the components, spray drying, spray coating, fluidized bed drying, absorption, adsorption, coacervation, complexation, or any other standard technique. In general, the taste potentiator(s) and/or active substances(s) may be encapsulated by an encapsulant. For purposes of some embodiments described herein, the term "encapsulant" refers to a material that can fully or partially coat or enrobe another substance. Encapsulation is also meant to include adsorption of a substance onto another substance and the formation of agglomerates or conglomerates between two substances.

Any material conventionally used as an encapsulant in edible products may be employed. In some embodiments, for instance, it may be desirable to use an encapsulant that delays the release of the taste potentiator(s), such as, for example, a hydrophobic encapsulant. In contrast, in other embodiments, it may be desirable to increase the rate of release by using an encapsulant such as, for example, a hydrophilic material. Moreover, more than one encapsulant may be used. For example, a taste potentiator or an active substance may be encapsulated by a mixture of two or more encapsulants to tailor the rate of release.

It is believed that taste potentiators can act in conjunction with active substances to enhance their activity. In some embodiments, therefore, it may be desirable to control the release of the potentiator(s) such that it substantially coincides with that of the active substance(s) included in the composition. As discussed above, some taste potentiators have rapid release rates, whereas other taste potentiators have slower release rates. Meanwhile, some active substances have rapid release rates, whereas others have slower release rates. In some embodiments, the material used to encapsulate the taste potentiator(s) may be selected to delay or increase the release rate of the potentiator(s) based on the release profiles of both the potentiator(s) and active substance(s) selected for use together in the composition.

More specifically, in some embodiments, the active substance(s) contained in the composition may have a slower release profile than the taste potentiator(s) selected for use in the same composition. It may be desirable, therefore, to delay the release of the taste potentiator(s) from the composition such that it releases substantially in conjunction with the active(s). The corresponding release profile may increase the effectiveness of the taste potentiator(s) in enhancing the perception of the active(s) throughout consumption.

Suitable encapsulants for use in delayed release embodiments include, but are not limited to, polyvinyl acetate, polyethylene, crosslinked polyvinyl pyrrolidone, polymethylmethacrylate, polylacticacid, polyhydroxyalkanoates, ethylcellulose, polyvinyl acetatephthalate, methacrylicacid-co-methylmethacrylate and combinations thereof.

In some embodiments, as mentioned above, the taste potentiator(s) may be water-soluble. For example, the following taste potentiators are water-soluble: neohesperidin dihydrochalcone, chlorogenic acid, alapyridaine, cynarin, miraculin, glupyridaine, pyridinium-betain compounds, glutamates, such as monosodium glutamate and monopotassium glutamate, neotame, thaumatin, tagatose, trehalose, salts, such as sodium chloride, monoammonium glycyrrhizinate, vanilla extract (in ethyl alcohol), water-soluble sugar acids, potassium chloride, sodium acid sulfate, water-soluble hydrolyzed vegetable proteins, water-soluble hydrolyzed animal proteins, water-soluble yeast extracts, adenosine monophosphate (AMP), glutathione, water-soluble nucleotides, such as inosine monophosphate, disodium inosinate, xanthosine monophosphate, guanylate monophosphate, alapyridaine (N-(1-carboxyethyl)-6-(hydroxymethyl)pyridinium-3-ol inner salt, sugar beet extract (alcoholic extract), sugarcane leaf essence (alcoholic extract), curculin, strogin, mabinlin, gymnemic acid, 2-hydroxybenzoic acid (2-HB), 3-hydroxybenzoic acid (3-HB), 4-hydroxybenzoic acid (4-HB), 2,3-dihydroxybenzoic acid (2,3-DHB), 2,4-dihydroxybenzoic acid (2,4-DHB), 2,5-dihydroxybenzoic acid (2,5-DHB), 2,6-dihydroxybenzoic acid (2,6-DHB), 3,4-dihydroxybenzoic acid (3,4-DHB), 3,5-dihydroxybenzoic acid (3,5-DHB), 2,3,4-trihydroxybenzoic acid (2,3,4-THB), 2,4,6-trihydroxybenzoic acid (2,4,6-THB), 3,4,5-trihydroxybenzoic acid (3,4,5-THB), 4-hydroxyphenylacetic acid, 2-hydroxyisocaproic acid, 3-hydroxycinnamic acid, 3-aminobenzoic acid, 4-aminobenzoic acid and combinations thereof. Due to their water-solubility, such taste potentiators may tend to release rapidly from the compositions into which they are incorporated. As such, in some embodiments, water-soluble taste potentiators may be encapsulated by an encapsulant that delays the release of the potentiator(s), as provided above.

In other embodiments, it may be desirable to increase the release of the taste potentiator(s) from the composition. For instance, the taste potentiator(s) included in the composition may have a slower release rate than the active substance(s) selected for use in combination therewith. This difference in release rates may reduce the effectiveness of the taste potentiator(s). Accordingly, such taste potentiators may be encapsulated with an encapsulant that increases the rate of the potentiator's release. Thereby, the release of the potentiator(s) and the active(s) may substantially coincide during consumption.

Suitable encapsulants for use in increased release embodiments include, but are not limited to, cyclodextrins, sugar alcohols, starch, gum arabic, polyvinylalcohol, polyacrylic acid, gelatin, guar gum, fructose and combinations thereof.

In some embodiments, as mentioned above, the taste potentiator(s) may be substantially or completely insoluble in water. For example, the following taste potentiators are substantially or completely water-insoluble: citrus aurantium, vanilla oleoresin, water insoluble sugar acids, water insoluble hydrolyzed vegetable proteins, water insoluble hydrolyzed animal proteins, water insoluble yeast extracts, insoluble nucleotides, sugarcane leaf essence and combinations thereof. Due to their poor solubility in water, such taste potentiators may tend to release slowly from the compositions. As such, in some embodiments, substantially or completely water-insoluble taste potentiators may be encapsulated by an encapsulant that increases the release of the potentiator(s), as provided above.

In accordance with the above, the encapsulated taste potentiator may include a taste potentiator and an encapsulant. The encapsulant may be selected based upon the desired release profile of the taste potentiator. In some embodiments, the taste potentiator(s) may be present in amounts of about 0.01% to about 10% by weight of the composition, more specifically about 0.1% to about 2% by weight of the composition.

In some embodiments, the encapsulant may be present in amounts of about 1% to about 95% by weight of the composition, more specifically about 5% to about 30% by weight of the composition.

In some embodiments, the encapsulated substance, i.e. encapsulated taste potentiator(s) or active(s), may have a high tensile strength, such as at least about 6,500 psi. More specifically, the tensile strength may be about 6,500 psi to about 200,000 psi. Such tensile strengths may be suitable for controlling the release of the taste potentiator(s) and/or active substance(s) in a consistent manner over an extended period of time. Tensile strengths of encapsulated substances are described in more detail in U.S. Patent Publication No. 2005/0112236 A1, the contents of which are incorporated by reference herein.

In some embodiments, the active substance(s) included in the potentiator compositions may be present in amounts of about 1% to about 95% by weight of the composition, more specifically about 5% to about 30% by weight of the composition.

The active substance(s) may be any component for which the perception is enhanced in some manner by the presence of one or more taste potentiators. Suitable active substances include, but are not limited to, compounds that provide flavor, sweetness, tartness, umami, kokumi, savory, saltiness, cooling, warmth or tingling. Other suitable actives include oral care agents, nutraceutical actives and pharmaceutical actives. Combinations of active substances also may be employed.

Compounds that provide flavor (flavorings or flavor agents), which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, yazu, sudachi, and fruit essences including apple, pear, peach, grape, blueberry, strawberry, raspberry, cherry, plum, pineapple, watermelon, apricot, banana, melon, apricot, ume, cherry, raspberry, blackberry, tropical fruit, mango, mangosteen, pomegranate, papaya and so forth. Other potential flavors include a milk flavor, a butter flavor, a cheese flavor, a cream flavor, and a yogurt flavor; a vanilla flavor; tea or coffee flavors, such as a green tea flavor, a oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor. These flavoring agents may be used in liquid or solid form and may be used individually or in admixture. Commonly used flavors include mints such as peppermint, menthol, spearmint, artificial vanilla, cinnamon derivatives, and various fruit flavors, whether employed individually or in admixture. Flavors may also provide breath freshening properties, particularly the mint flavors when used in combination with cooling agents.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63-258, by the National Academy of Sciences, may be used. This publication is incorporated herein by reference.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, and mixtures thereof.

In some embodiments, the flavor agent may be employed in either liquid form and/or dried form. When employed in the latter form, suitable drying means such as spray drying the oil may be used. Alternatively, the flavor agent may be absorbed onto water soluble materials, such as cellulose, starch, sugar, maltodextrin, gum arabic and so forth or may be encapsulated. The actual techniques for preparing such dried forms are well-known.

In some embodiments, the flavor agents may be used in many distinct physical forms well-known in the art to provide an initial burst of flavor and/or a prolonged sensation of flavor. Without being limited thereto, such physical forms include free forms, such as spray dried, powdered, beaded forms, encapsulated forms, and mixtures thereof.

Compounds that provide sweetness (sweeteners or sweetening agents) may include bulk sweeteners such as sugars, sugarless bulk sweeteners, or the like, or mixtures thereof.

Suitable sugar sweeteners generally include mono-saccharides, di-saccharides and poly-saccharides such as but not limited to, sucrose (sugar), dextrose, maltose, dextrin, xylose, ribose, glucose, lactose, mannose, galactose, fructose (levulose), invert sugar, fructo oligo saccharide syrups, partially hydrolyzed starch, corn syrup solids, isomaltulose and mixtures thereof.

Suitable sugarless bulk sweeteners include sugar alcohols (or polyols) such as, but not limited to, sorbitol, xylitol, mannitol, galactitol, maltitol, hydrogenated isomaltulose (ISOMALT), lactitol, erythritol, hydrogenated starch hydrolysate, stevia and mixtures thereof.

Suitable hydrogenated starch hydrolysates include those disclosed in U.S. Pat. No. 4,279,931 and various hydrogenated glucose syrups and/or powders which contain sorbitol, maltitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN®, a commercially available product manufactured by Roquette Freres of France, and HYSTAR®, a commercially available product manufactured by SPI Polyols, Inc. of New Castle, Del., are also useful.

In some embodiments, high-intensity sweeteners may be used. Without being limited to particular sweeteners, representative categories and examples include:

(a) water-soluble sweetening agents such as dihydrochalcones, monellin, stevia, steviosides, rebaudioside A, glycyrrhizin, dihydroflavenol, and sugar alcohols such as sorbitol, mannitol, maltitol, xylitol, erythritol and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and mixtures thereof;

(c) dipeptide based sweeteners, such as L-aspartic acid derived sweeteners, such as L-aspartyl-L-phenylalanine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), N—[N-(3,3-dimethylbutyl)-L-aspartyl]-L-phenylalanine 1-methyl ester (Neotame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and mixtures thereof;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructofuranoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro-4,6,1',6'-tetradeoxygalacto-sucrose; and 4,6,1',6'-tetradeoxy-sucrose, and mixtures thereof;

(e) protein based sweeteners such as *Thaumatococcus danielli* (Thaumatin I and II) and talin;

(f) the sweetener monatin (2-hydroxy-2-(indol-3-ylmethyl)-4-aminoglutaric acid) and its derivatives; and (g) the sweetener Lo han guo (sometimes also referred to as "Lo han kuo").

The intense sweetening agents may be used in many distinct physical forms well-known in the art to provide an initial burst of sweetness and/or a prolonged sensation of sweetness. Without being limited thereto, such physical forms include free forms, such as spray dried, powdered, beaded forms, encapsulated forms, and mixtures thereof.

Compounds that provide tartness may include acidulants, such as acetic acid, adipic acid, ascorbic acid, butyric acid, citric acid, formic acid, fumaric acid, glyconic acid, lactic acid, phosphoric acid, malic acid, oxalic acid, succinic acid, tartaric acid and mixtures thereof.

Compounds that provide umami or savory flavor may include monosodium glutamate (MSG), glutamic acid, glutamates, aspartate, free amino acids, IMP (disodium 5'-inosine monophosphate) and GMP (disodium 5'-guanosine monophosphate), compounds that stimulate T1R1 and T1R3 receptors, mushroom flavor, fermented fish flavor, and muscle flavors, such as beef, chicken, pork, ostrich, venison and buffalo.

Substances that impart kokumi may include a mixture selected from: (1) gelatin and tropomyosin and/or tropomyosin peptides; (2) gelatin and paramyosin; and (3) troponin and tropomyosin and/or tropomyosin peptides, as disclosed in U.S. Pat. No. 5,679,397 to Kuroda et al., referred to above.

Compounds that provide saltiness may include conventional salts, such as sodium chloride, calcium chloride, potassium chloride, 1-lysine and combinations thereof.

Compounds that provide a cooling sensation may include physiological cooling agents. A variety of well known cooling agents may be employed. For example, among the useful cooling agents are included xylitol, erythritol, dextrose, sorbitol, menthane, menthone, ketals, menthone ketals, menthone glycerol ketals, substituted p-menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p-menthane, 2-mercapto-cyclo-decanone, hydroxycarboxylic acids with 2-6 carbon atoms, cyclohexanamides, menthyl acetate, menthyl salicylate, N,2,3-trimethyl-2-isopropyl butanamide (WS-23), N-ethyl-p-menthane-3-carboxamide (WS-3), isopulegol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, Japanese mint oil, peppermint oil, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, Eucalyptus extract (p-Mehtha-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo (2.2.1), Heptane-2-carboxamide; and Menthol methyl ether, and menthyl pyrrolidone carboxylate among others. These and other suitable cooling agents are further described in the following U.S. patents, all of which are incorporated in their entirety by reference hereto: U.S. Pat. Nos. 4,230,688; 4,032,661; 4,459,425; 4,136,163; 5,266,592; 6,627,233.

Compounds that provide warmth (warming agents) may be selected from a wide variety of compounds known to provide the sensory signal of warming to the individual user. These compounds offer the perceived sensation of warmth, particularly in the oral cavity, and often enhance the perception of flavors, sweeteners and other organoleptic components. Useful warming agents include those having at least one allyl vinyl component, which may bind to oral receptors. Examples of suitable warming agents include, but are not limited to: vanillyl alcohol n-butylether (TK-1000, supplied by Takasago Perfumery Company Ltd., Tokyo, Japan); vanillyl alcohol n-propylether; vanillyl alcohol isopropylether; vanillyl alcohol isobutylether; vanillyl alcohol n-aminoether; vanillyl alcohol isoamylether; vanillyl alcohol n-hexylether; vanillyl alcohol methylether; vanillyl alcohol ethylether; gingerol; shogaol; paradol; zingerone; capsaicin; dihydrocapsaicin; nordihydrocapsaicin; homocapsaicin; homodihydrocapsaicin; ethanol; isopropyl alcohol; iso-amylalcohol; benzyl alcohol; glycerine; chloroform; eugenol; cinnamon oil; cinnamic aldehyde; phosphate derivatives thereof; and combinations thereof.

Compounds that provide a tingling sensation also are known and referred to as "tingling agents." Tingling agents may be employed to provide a tingling, stinging or numbing sensation to the user. Tingling agents include, but are not limited to: Jambu Oleoresin or para cress (*Spilanthes* sp.), in which the active ingredient is Spilanthol; Japanese pepper extract (*Zanthoxylum peperitum*), including the ingredients known as Saanshool-I, Saanshool-II and Sanshoamide; black pepper extract (*piper nigrum*), including the active ingredients chavicine and piperine; Echinacea extract; Northern Prickly Ash extract; and red pepper oleoresin. In some embodiments, alkylamides extracted from materials such as jambu or sanshool may be included. Additionally, in some embodiments, a sensation is created due to effervescence. Such effervescence is created by combining an alkaline material with an acidic material, either or both of which may be encapsulated. In some embodiments, an alkaline material may include alkali metal carbonates, alkali metal bicarbonates, alkaline earth metal carbonates, alkaline earth metal bicarbonates and mixtures thereof. In some embodiments, an acidic material may include acetic acid, adipic acid, ascorbic acid, butyric acid, citric acid, formic acid, fumaric acid, glyconic acid, lactic acid, phosphoric acid, malic acid, oxalic acid, succinic acid, tartaric acid and combinations thereof. Examples of "tingling" type sensates can be found in U.S. Pat. No. 6,780,443, the entire contents of which are incorporated herein by reference for all purposes. Tingling agents are described in U.S. Pat. No. 6,780,443 to Nakatsu et al., U.S. Pat. No. 5,407,665 to McLaughlin et al., U.S. Pat. No. 6,159,509 to Johnson et al. and U.S. Pat. No. 5,545,424 to Nakatsu et al., each of which is incorporated by reference herein in its entirety.

Oral care agents that may be used include those actives known to the skilled artisan, such as, but not limited to, surfactants, breath freshening agents, anti-microbial agents, antibacterial agents, anti-calculus agents, anti-plaque agents, oral malodor control agents, fluoride compounds, quaternary ammonium compounds, remineralization agents and combinations thereof.

Suitable surfactants include, but are not limited to, salts of fatty acids selected from the group consisting of $C_8$-$C_{24}$, palmitoleic acid, oleic acid, eleosteric acid, butyric acid, caproic acid, caprylic acid, capric acid, lauric acid, myristic acid, palmitic acid, stearic acid, ricinoleic acid, arachidic acid, behenic acid, lignoceric acid, cerotic acid, sulfated butyl oleate, medium and long chain fatty acid esters, sodium oleate, salts of fumaric acid, potassium glomate, organic acid esters of mono- and diglycerides, stearyl monoglyceridyl citrate, succistearin, dioctyl sodium sulfosuccinate, glyceryl tristearate, lecithin, hydroxylated lecithin, sodium lauryl sulfate, acetylated monoglycerides, succinylated monoglycerides, monoglyceride citrate, ethoxylated mono- and diglycerides, sorbitan monostearate, calcium stearyl-2-lactylate, sodium stearyl lactylate, lactylated fatty acid esters of glycerol and propylene glycol, glycerol-lactoesters of $C_8$-$C_{24}$ fatty acids, polyglycerol esters of $C_8$-$C_{24}$ fatty acids, propylene glycol alginate, sucrose $C_8$-$C_{24}$ fatty acid esters, diacetyl tartaric and citric acid esters of mono- and diglycerides, triacetin, sarcosinate surfactants, isethionate surfactants, tautate surfactants, pluronics, polyethylene oxide condensates of alkyl phenols, products derived from the condensation of ethylene oxide with the reaction product of propylene oxide and ethylene diamine, ethylene oxide condensates of aliphatic alcohols, long chain tertiary amine oxides, long chain tertiary phosphine oxides, long chain dialkyl sulfoxides, and combinations thereof.

Suitable antibacterial agents include, but are not limited to, chlorhexidine, alexidine, quaternary ammonium salts, benzethonium chloride, cetyl pyridinium chloride, 2,4,4'-trichloro-2'-hydroxy-diphenyl ether (triclosan) and combinations thereof.

Suitable fluoride compounds include, but are not limited to, sodium fluoride, sodium monofluorophosphate, stannous fluoride and combinations thereof.

Suitable anti-calculus agents include, but are not limited to, pyrophosphates, triphosphates, polyphosphates, polyphosphonates, dialkali metal pyrophosphate salt, tetra alkali polyphosphate salt, tetrasodium pyrophosphate, tetrapotassium pyrophosphate, sodium tripolyphosphate and combinations thereof.

Suitable anti-microbial agents include, but are not limited to, cetylpyridinium chloride, zinc compounds, copper compounds and combinations thereof.

Suitable remineralization agents include, but are not limited to casein phosphopeptide-amorphous calcium phosphate, casein phosphoprotein-calcium phosphate complex, casein phosphopeptide-stabilized calcium phosphate, and combinations thereof.

Other oral care actives known to those skilled in the art are considered well within the scope of the present invention.

Pharmaceutical actives include drugs or medicaments, breath fresheners, vitamins and other dietary supplements, minerals, caffeine, nicotine, fruit juices, and the like, and mixtures thereof. Examples of useful drugs include ace-inhibitors, antianginal drugs, anti-arrhythmias, anti-asthmatics, anti-cholesterolemics, analgesics, anesthetics, anti-convulsants, anti-depressants, anti-diabetic agents, anti-diarrhea preparations, antidotes, anti-histamines, anti-hypertensive drugs, anti-inflammatory agents, anti-lipid agents, anti-manics, anti-nauseants, anti-stroke agents, anti-thyroid preparations, anti-tumor drugs, anti-viral agents, acne drugs, alkaloids, amino acid preparations, anti-tussives, anti-uricemic drugs, anti-viral drugs, anabolic preparations, systemic and non-systemic anti-infective agents, anti-neoplastics, anti-parkinsonian agents, anti-rheumatic agents, appetite stimulants, biological response modifiers, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies such as sildenafil citrate, which is currently marketed as Viagra®, fertility agents, gastrointestinal agents, homeopathic remedies, hormones, hypercalcemia and hypocalcemia management agents, immunomodulators, immunosuppressives, migraine preparations, motion sickness treatments, muscle relaxants, obesity management agents, osteoporosis preparations, oxytocics, parasympatholytics, parasympathomimetics, prostaglandins, psychotherapeutic agents, respiratory agents, sedatives, smoking cessation aids such as bromocryptine or nicotine, sympatholytics, tremor preparations, urinary tract agents, vasodilators, laxatives, antacids, ion exchange resins, anti-pyretics, appetite suppressants, expectorants, anti-anxiety agents, anti-ulcer agents, anti-inflammatory substances, coronary dilators, cerebral dilators, peripheral vasodilators, psycho-tropics, stimulants, anti-hypertensive drugs, vasoconstrictors, migraine treatments, antibiotics, tranquilizers, anti-psychotics, anti-tumor drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spasmodics, terine relaxants, anti-obesity drugs, erythropoietic drugs, anti-asthmatics, cough suppressants, mucolytics, DNA and genetic modifying drugs, and combinations thereof.

In some embodiments, a mixture of at least one active substance and at least one taste potentiator is encapsulated, rather than encapsulating the taste potentiator or the active substance alone. Similar to above, the encapsulant may be selected to delay or increase the rate of release of the mixture of components. Any of the encapsulants described above may be employed.

For example, in some embodiments, the active substance(s) may be at least one intense sweetener. The intense sweetener(s) may be mixed with at least one taste potentiator, which is selected to increase the sweet taste of the intense sweetener(s). This mixture of components may then be encapsulated. Examples of suitable intense sweeteners include, but are not limited to, neotame, aspartame, Acesulfame-K, sucralose, saccharin and combinations thereof.

In embodiments including an encapsulated mixture of active(s) and potentiator(s), the active substance(s) may be present in amounts of about 1% to about 95% by weight of the composition, more specifically about 5% to about 30% by weight. The taste potentiator(s) may be present in amounts of about 0.01% to about 12% by weight of the composition, more specifically about 0.1% to about 5% by weight. The encapsulant may be present in amounts of about 1% to about 95% by weight of the composition, more specifically about 10% to about 60% by weight.

As mentioned above, some embodiments may include a mixture of at least one encapsulated taste potentiator and at least one taste potentiator in its free form. The encapsulated and unencapsulated taste potentiators may be the same or different. The encapsulated taste potentiator(s) may be encapsulated by any of the materials described above. The mixture of encapsulated and unencapsulated taste potentiators may be combined with one or more active substances to provide a potentiator composition.

Some other embodiments provide compositions that modulate the activity of taste receptor cells in a mammal. Such compositions may include at least one active substance and at least one taste potentiator, as described above. These components may be encapsulated or unencapsulated, also as described above. The taste potentiator(s) may modulate the activity of taste receptor cells upon consumption of the composition. More specifically, taste is perceived through sensory cells located in the taste buds. Different signaling mechanisms sense the primary tastes of salty, sour, sweet, bitter and umami. Eventually a nerve impulse is triggered in the brain that is sensed as one of these primary tastes.

Taste potentiators function by modulating the activity of taste receptor cells at some point in this taste signaling pathway. For instance, in some cases, taste potentiators may bind to taste receptors, such as, for example, sweet taste receptors, which thereby enhances the perception of the sweet taste. In other embodiments, for example, taste potentiators may block taste receptors, such as, for example bitter receptors, which suppresses the perception of a bitter taste and thereby enhances the perception of a sweet taste. Taste potentiator(s), therefore, modulate the activity of taste receptor cells in mammals, which thereby enhances the perception of a given taste. This activity may enhance the perception of an active substance contained in the composition when consumed in conjunction with a taste potentiator.

Edible Orally Delivered Products

In some embodiments, the potentiator compositions may reside in an orally delivered product including at least one active substance and at least one taste potentiator.

The orally delivered product may be a foodstuff, pharmaceutical or personal care product. Preferred foodstuffs include confectionery, especially chocolates, hard boilings and other sugar-based candies, jellies, soft candies, edible films, lozenges, pressed tablets, cereal bars, chewing gum, and the like. Pharmaceuticals may be delivered in the form of a tablet, capsule, solution, tincture, linctus or syrup. Confectionery and solid pharmaceutical delivery forms optionally can be coated. Exemplary personal products include toothpaste, mouth spray, and mouthwash.

In some embodiments, the orally delivered product may be a frozen or refrigerated/perishable product. Such frozen or refrigerated foodstuffs may include, but are not limited to, frozen desserts, frozen confections, yogurts, puddings, frozen baked goods and whipped toppings.

In still other embodiments, sweetened orally delivered products may include jams, jellies, peanut butter, baked goods, syrups, toppings, and sweet and salty snacks, such as sweetened roasted nuts, kettle corn, barbeque potato snacks, and the like.

In some embodiments, the orally delivered product may include a confectionery base or gum base and any of the potentiator compositions described herein. In some embodiments, some or all of the active and/or the taste potentiator may be employed in a free form (e.g., unencapsulated). Alternatively, the product may include some or all of the active and/or the taste potentiator in an encapsulated form. As a further alternative, the product may include some of the active and/or the taste potentiator in a free form and some of the active and/or the taste potentiator in an encapsulated form. In some embodiments, the product may include two or more potentiator compositions.

In some embodiments, the potentiator composition used in the orally delivered product may be a sweetener potentiator composition including 3-HB and/or 2,4-DHB. As mentioned above, 3-HB and 2,4-DHB act synergistically with one another to enhance the sweetness of orally delivered products into which the potentiators are incorporated.

For beverages and confectionery products, the concentration of 3-HB, as calculated in the form of the free acid, generally may be up to 1500 ppm in the orally delivered product, more specifically in the range from 100 to 1500 ppm, even more specifically in the range from 200 to 1000 ppm, yet more specifically in the range from 300 to 800 ppm and most specifically in the range from 400 to 600 ppm.

For beverages and confectionery products, the concentration of 2,4-DHB, as calculated in the form of the free acid, generally may be up to 1500 ppm in the product, more specifically in the range from 100 to 1500 ppm, even more specifically in the range from 200 to 1000 ppm, yet more specifically in the range from 300 to 800 ppm and most specifically in the range from 400 to 600 ppm.

In general, the combined concentration of 3-HB and 2,4-DHB may be no more than 1500 ppm in beverages and confectioneries.

For chewing gums, the concentration of 3-HB and/or 2,4-DHB, as calculated in the form of the free acid, generally may be up to 5000 ppm in the product, more specifically in the range from 100 to 5000 ppm, even more specifically in the range from 1000 to 5000 ppm, yet more specifically in the range from 2000 to 5000 ppm and most specifically in the range from 3000 to 5000 ppm.

Of course, the required concentrations will depend upon the nature of the orally delivered product to be sweetened, the level of sweetness required, the nature of the sweetener(s) in the product and the degree of enhancement required.

Confectionery Compositions

When the orally delivery product is a confectionery composition, the product may be a comestible selected from forms such as, but not limited to, hard candy, soft candy, center-fill candy, cotton candy, pressed tablets, edible film, lozenges, and the like.

Confectionery compositions may include a confectionery base and any of the potentiator compositions described above, which may include at least one active substance and at least one taste potentiator. The confectionery compositions also may include a variety of optional additives, as provided in more detail below. Upon consumption, the composition containing the active(s) and the taste potentiator(s) releases from the confection and provides an enhanced perception of the active(s) contained therein.

For example, in some embodiments, the active substance may be at least one sweetener, such as, a sugar sweetener, sugarless bulk sweetener, intense sweetener or any combination thereof. In general, the active substance(s) may be present in amounts of about 0.0001% to about 75% by weight of the confectionery composition. In some embodiments, which include actives other than intense sweeteners, the active substance(s) may be present in amounts of about 25% to about 75% by weight of the confectionery composition. The taste potentiator(s) may be present in amounts of about 0.01% to about 10% by weight of the confectionery composition.

Some embodiments are directed to a comestible in the form of a lozenge or candy, also commonly referred to as confectioneries. Such confectionery compositions may include a confectionery base including bulk sweeteners such as sugars and sugarless bulk sweeteners, or the like, or mixtures thereof. Bulk sweeteners generally are present in amounts of about 0.05% to about 99% by weight of the composition.

A variety of traditional ingredients also may be included in the confectioneries in effective amounts such as coloring agents, antioxidants, preservatives, sweeteners, and the like. Coloring agents may be used in amounts effective to produce the desired color. The coloring agents may include pigments which may be incorporated in amounts up to about 6%, by weight of the composition. For example, titanium dioxide may be incorporated in amounts up to about 2%, and preferably less than about 1%, by weight of the composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No. 2, which is the disodium salt of 5,5-indigotindisulfonic acid. Similarly, the dye known as F.D.& C. Green No. 1 comprises a triphenylmethane dye and is the monosodium salt of 4-[4-(N-ethyl-p-sulfoniumbenzylamino) diphenylmethylene]-[1-(N-ethyl-N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference.

Lubricants also may be added in some embodiments to improve the smoothness of the comestible, such as, for example hard candy embodiments. Smoothness also is a characteristic that leads to an increased perception of hydration upon consumption. Suitable lubricants include, but are not limited to, fats, oils, aloe vera, pectin and combinations thereof.

Similarly, in some embodiments, the comestible may have smooth edges. In such embodiments, the comestible may have any shape, such as square, circular or diamond-shaped, however, the edges are rounded to provide a smooth comestible. Another manner of lending smoothness to the comestibles is to deposit the comestible composition into moulds during the manufacturing process. Accordingly, in some embodiments, the comestible is deposited, as described in more detail below.

In some embodiments, the confectionery composition may further include a sweetener selected from Lo han guo, stevia, monatin and combinations thereof.

Other conventional additives known to one having ordinary skill in the art also may be used in the confectionery compositions.

In some embodiments, confectionery compositions may be produced by batch processes. Such confections may be prepared using conventional apparatus such as fire cookers, cooking extruders, and/or vacuum cookers. In some embodiments, the bulk sweetener (sugar or sugar free) and a solvent (e.g., water), are combined in a mixing vessel to form a slurry. The slurry is heated to about 70° C. to 120° C. to dissolve any sweetener crystals or particles and to form an aqueous solution. Once dissolved, heat and vacuum are applied to cook the batch and boil off water until a residual moisture of less than about 4% is achieved. The batch changes from a crystalline to an amorphous, or glassy, phase. The potentiator composition then may be admixed in the batch by mechanical mixing operations, along with any other optional additives, such as coloring agents, flavorants, and the like. The batch is then cooled to about 50° C. to 10° C. to attain a semi-solid or plastic-like consistency.

The optimum mixing required to uniformly mix the actives, potentiators, and other additives during manufacturing of hard confectionery is determined by the time needed to obtain a uniform distribution of the materials. Normally, mixing times of from four to ten minutes have been found to be acceptable. Once the candy mass has been properly tempered, it may be cut into workable regions or formed into desired shapes having the correct weight and dimensions. A variety of forming techniques may be utilized depending upon the shape and size of the final product desired. Once the desired shapes are formed, cool air is applied to allow the comestibles to set uniformly, after which they are wrapped and packaged.

Alternatively, various continuous cooking processes utilizing thin film evaporators and injection ports for incorporation of ingredients including the potentiator compositions are known in the art and may be used as well.

The apparatus useful in accordance with some embodiments comprise cooking and mixing apparatus well known in the confectionery manufacturing arts, and selection of specific apparatus will be apparent to one skilled in the art.

Additionally, in some embodiments, various confectionery configurations with multiple regions may be employed. These configurations may include, but are not limited to, liquid center-fill, powder center-fill, hard coated, soft coated, laminated, layered and enrobed. In some embodiments, the potentiator composition may be included in one region or in multiple regions of the product.

Soft Confectionery Compositions

In some embodiments, the orally delivered product may be in the form of various soft confectionery formats. Soft confectionery formats may include, but are not limited to, nougat, caramel, taffy, gummies and jellies.

Soft confectionery compositions may include a confectionery base and any of the potentiator compositions described above, which may include at least one active substance and at least one taste potentiator. The soft confectionery compositions also may include a variety of optional additives, such as any of the additives set forth above in the section describing confectionery compositions. Upon consumption, the composition containing the active(s) and the taste potentiator(s) releases from the soft confection and provides an enhanced perception of the active(s) contained therein.

For example, in some embodiments, the active substance may be at least one sweetener, such as, a sugar sweetener, sugarless bulk sweetener, intense sweetener or any combination thereof. In general, the active substance(s) may be present in amounts of about 0.0001% to about 75% by weight of the soft confectionery composition. In some embodiments, which include actives other than intense sweeteners, the active substance(s) may be present in amounts of about 25% to about 75% by weight of the soft confectionery composition. The taste potentiator(s) may be present in amounts of about 0.01% to about 10% by weight of the soft confectionery composition.

Some soft confectionery compositions include nougat compositions, which may include two principal components, a high-boiled candy and a frappe. By way of example, egg albumen or substitute thereof is combined with water and whisked to form a light foam. Sugar and glucose are added to water and boiled typically at temperatures of from about 130° C. to 140° C. and the resulting boiled product is poured into a mixing machine and beaten until creamy. The beaten albumen and flavoring agent are combined with the creamy product and the combination is thereafter thoroughly mixed.

In some embodiments, a caramel composition may include sugar (or sugar substitute), corn syrup (or polyol syrup), partially hydrogenated fat, milk solids, water, butter, flavors, emulsifiers, and salt. To prepare the caramel, the sugar/sugar substitute, corn syrup/polyol syrup, and water may be mixed together and dissolved over heat. Then, the milk solids may be mixed in to the mass to form a homogeneous mixture. Next, the minor ingredients may be mixed in with low heat. The heat then may be increased to boiling. Once sufficient water is removed and color/flavor developed, the mass may be cooled somewhat and temperature sensitive ingredients (including some potentiators) may be mixed in prior to discharging and forming/shaping/wrapping the finished product.

In some embodiments, a taffy composition may include sugar (or sugar substitute), corn syrup (or polyol syrup), partially hydrogenated fat, water, flavors, emulsifiers, and salt. The process for preparing taffy can be similar to that for caramel and, optionally, the final taffy mass may be pulled to develop its desired texture.

In some embodiments, a gummi composition may include sugar (or sugar substitute), corn syrup (or polyol syrup), gelatin (or suitable hydrocolloid), flavor, color, and optionally acid. The gummi may be prepared by hydrating the gelatin or suitable hydrocolloid, heating the sugar/corn syrup (sugar substitute/polyol syrup) and combining the two components with heat. Once the combined mixture reaches its final temperature or suitable sugar solids level, components such as flavor, color, and the like may be incorporated into the mixture and then poured into molds prior to cooling, wrapping, and finishing. Various surface treatments such as applications of wax or fat can be applied to decrease sticking.

In some embodiments, a jelly composition may include a starch-based jelly or a pectin-based jelly. As with gummis, jelly products may be produced by hydrating the hydrocolloid and combining the hydrated mixture with a cooked syrup component. The mixture then may be cooked to a final moisture content and minor components may be incorporated. As with gummis, jelly candies may be poured into molds such as starch molds. As with gummis, surface treatments, such as fats or waxes, may be applied. Additionally, jelly candies may have dry surface treatments, such as applications of sanding sugar, acid, non-pareils, and the like.

Additionally, in some embodiments, various soft confectionery configurations with multiple regions may be employed. These configurations may include, but are not limited to, liquid center-fill, powder center-fill, hard coated, soft coated, laminated, layered and enrobed. In some embodiments, the potentiator composition may be included in one region or in multiple regions of the product.

Chewing Gum Compositions

Some embodiments provide chewing gum compositions for delivery of the potentiator compositions described above. Such chewing gum compositions may include a gum base and any of the potentiator compositions described above, which may include at least one active substance and at least one taste potentiator. The chewing gum compositions also may include a variety of optional additives, as provided in more detail below. Upon consumption, the composition containing the active(s) and the taste potentiator(s) releases from the chewing gum and provides an enhanced perception of the active(s) contained therein.

As described in detail above, in some embodiments, the potentiator composition generally includes at least one active substance and at least one taste potentiator. In some embodiments, the taste potentiator(s) and/or active(s) may be encapsulated, as described above, or a mixture of the active(s) and taste potentiator(s) may be encapsulated. These components may be selected from any of those described above. For example, in some embodiments, the active substance may be at least one sweetener, such as, a sugar sweetener, sugarless bulk sweetener, intense sweetener or any combination thereof. In general, the active substance(s) may be present in amounts of about 0.0001% to about 75% by weight of the chewing gum composition. In some embodiments, which include actives other than intense sweeteners, the active substance(s) may be present in amounts of about 25% to about 75% by weight of the chewing gum composition. The taste potentiator(s) may be present in amounts of about 0.01% to about 10% by weight of the chewing gum composition.

In some embodiments, the chewing gum composition may include multiple taste potentiators. The taste potentiators may be encapsulated or unencapsulated and may be the same or different. In some embodiments, the multiple taste potentiators may be different. Some chewing gum compositions, for instance, may include one or more taste potentiators that are encapsulated in combination with one or more different taste potentiators that are unencapsulated. In some embodiments, two different encapsulated taste potentiators may be used in a chewing gum composition. Alternatively, in some other embodiments, the chewing gum composition may include a combination of the same taste potentiator in its encapsulated and free forms.

The chewing gum composition also may include a gum base. The gum base may include any component known in the chewing gum art. Such components may be water soluble, water-insoluble or a combination thereof. For example, the gum base may include elastomers, bulking agents, waxes, elastomer solvents, emulsifiers, plasticizers, fillers and mixtures thereof.

The elastomers (rubbers) employed in the gum base will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and mixtures thereof. Examples of synthetic elastomers include, without limitation, styrene-butadiene copolymers (SBR), polyisobutylene, isobutylene-isoprene copolymers, polyethylene, polyvinyl acetate and the like, and mixtures thereof.

The amount of elastomer employed in the gum base may vary depending upon various factors such as the type of gum base used, the consistency of the gum composition desired and the other components used in the composition to make the final chewing gum product. In general, the elastomer will be present in the gum base in an amount from about 10% to about 60% by weight, desirably from about 35% to about 40% by weight.

In some embodiments, the gum base may include wax. It softens the polymeric elastomer mixture and improves the elasticity of the gum base. When present, the waxes employed will have a melting point below about 60° C., and preferably between about 45° C. and about 55° C. The low melting wax may be a paraffin wax. The wax may be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnuba wax, most petroleum waxes, and the like, and mixtures thereof.

In addition to the components set out above, the gum base may include a variety of other ingredients, such as components selected from elastomer solvents, emulsifiers, plasticizers, fillers, and mixtures thereof.

The gum base may contain elastomer solvents to aid in softening the elastomer component. Such elastomer solvents may include those elastomer solvents known in the art, for example, terpinene resins such as polymers of alpha-pinene or beta-pinene, methyl, glycerol and pentaerythritol esters of rosins and modified rosins and gums such as hydrogenated, dimerized and polymerized rosins, and mixtures thereof. Examples of elastomer solvents suitable for use herein may include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful in this invention include glyceryl monostearate, lecithin, fatty acid monoglycerides, diglycerides, propylene glycol monostearate, and the like, and mixtures thereof. The emulsifier may be employed in amounts from about 2% to about 15%, and more specifically, from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20% by weight of the gum base, and more specifically in amounts from about 9% to about 17%, by weight of the gum base.

Plasticizers also include hydrogenated vegetable oils, such as soybean oil and cottonseed oils, which may be employed alone or in combination. These plasticizers provide the gum base with good texture and soft chew characteristics. These plasticizers and softeners are generally employed in amounts from about 5% to about 14%, and more specifically in amounts from about 5% to about 13.5%, by weight of the gum base.

Anhydrous glycerin may also be employed as a softening agent, such as the commercially available United States Pharmacopeia (USP) grade. Glycerin is a syrupy liquid with a sweet warm taste and has a sweetness of about 60% of that of cane sugar. Because glycerin is hygroscopic, the anhydrous glycerin may be maintained under anhydrous conditions throughout the preparation of the chewing gum composition.

In some embodiments, the gum base may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, calcium sulfate and the like, and mixtures thereof. These fillers or adjuvants may be used in the gum base compositions in various amounts. Preferably the amount of filler, when used, will be present in an amount from about 15% to about 40%, and desirably from about 20% to about 30%, by weight of the gum base.

A variety of traditional ingredients may be optionally included in the gum base in effective amounts such as flavor agents and coloring agents, antioxidants, preservatives, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, vitamin E and mixtures thereof, may also be included. Other conventional chewing gum additives known to one having ordinary skill in the chewing gum art may also be used in the gum base.

The chewing gum compositions may include amounts of conventional additives selected from the group consisting of sweetening agents, plasticizers, softeners, emulsifiers, waxes, fillers, bulking agents (carriers, extenders, bulk sweeteners), mineral adjuvants, flavor agents and coloring agents, antioxidants, acidulants, thickeners, medicaments, oral care actives, such as remineralization agents, antimicrobials and tooth whitening agents, as described in assignee's co-pending U.S. patent application Ser. No. 10/901,511, filed on Jul. 29, 2004 and entitled "Tooth Whitening Compositions and Delivery Systems Therefor," which is incorporated herein by reference in its entirety, and the like, and mixtures thereof. Some of these additives may serve more than one purpose. For example, in sugarless gum compositions, a sweetener, such as maltitol or other sugar alcohol, may also function as a bulking agent.

Bulk sweeteners include sugars, sugarless bulk sweeteners, or the like, or mixtures thereof. Bulk sweeteners generally are present in amounts of about 5% to about 99% by weight of the chewing gum composition. Suitable sugar sweeteners and sugarless bulk sweeteners, as well as intense sweeteners are provided above in the description of the potentiator compositions.

In general, an effective amount of intense sweetener may be utilized to provide the level of sweetness desired, and this amount may vary with the sweetener selected. The intense sweetener may be present in amounts from about 0.001% to about 3%, by weight of the chewing gum composition, depending upon the sweetener or combination of sweeteners used. The exact range of amounts for each type of sweetener may be selected by those skilled in the art.

In some embodiments, the chewing gum composition may include a sweetener selected from Lo han guo, stevia, monatin and combinations thereof.

Any of the flavor agents discussed above as being suitable for use in the potentiator compositions also may be used in the chewing gum compositions. In chewing gum compositions, flavor agents generally may be present in amounts from about 0.02% to about 5%, and more specifically from about 0.1% to about 4%, and even more specifically, from about 0.8% to about 3%, by weight of the composition.

Coloring agents may be used in amounts effective to produce the desired color. The coloring agents may include pigments which may be incorporated in amounts up to about 6%, by weight of the composition. For example, titanium dioxide may be incorporated in amounts up to about 2%, and preferably less than about 1%, by weight of the composition. The colorants may also include natural food colors and dyes suitable for food, drug and cosmetic applications. Suitable coloring agents are set forth above in the description of confectionery compositions.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickeners, used alone or in combination with other softeners, such as methyl cellulose, alginates, carrageenan, xanthan gum, gelatin, carob, tragacanth, locust bean, and carboxy methyl cellulose, acidulants such as malic acid, adipic acid, citric acid, tartaric acid, fumaric acid, and mixtures thereof, and fillers, such as those discussed above under the category of mineral adjuvants.

Other conventional gum additives known to one having ordinary skill in the chewing gum art also may be used in the chewing gum compositions.

In some embodiments, the potentiator composition included in the chewing gum composition may include at least one active substance having a first solubility and at least one taste potentiator having a second solubility. The first and second solubilities may be substantially similar or different and may be selected to provide a controlled-release profile to the chewing gum composition. In particular, the selected solubilities may provide one of the following release profiles: simultaneous release, sequential release or partially overlapping release.

Some embodiments extend to methods of preparing a chewing gum product. The products may be prepared using standard techniques and equipment known to those skilled in the art. The apparatus useful in accordance with the embodiments described herein includes mixing and heating apparatus well known in the chewing gum manufacturing arts, and therefore the selection of the specific apparatus will be apparent to the artisan. For general chewing gum preparation processes see U.S. Pat. Nos. 4,271,197 to Hopkins et al, 4,352, 822 to Cherukuri et al and 4,497,832 to Cherukuri et al, each of which is incorporated herein by reference in its entirety.

More specifically, in accordance with some embodiments, at least one encapsulant and at least one taste potentiator may be mixed to form a dispersion of the components. In particular, the encapsulant(s) may be melted at elevated temperatures in a high shear mixer. The potentiator(s) may be added to the molten encapsulant and mixed under high shear to completely disperse the components. The components may be mixed at elevated temperatures of about 50-150° C. The resulting mixture of components may be cooled. A plurality of encapsulated taste potentiator particles subsequently may be formed from the mixture. The particles may be formed to an appropriate size as desired, generally from an average particle size range of about 50 µm to about 800 µm. This may be accomplished by any suitable means such as chopping, pulverizing, milling or grinding the particles.

Alternatively, the encapsulated particles may be prepared by spray drying methods. More specifically, the encapsulant(s) may be dissolved in water. In some embodiments, this solution may be prepared in an agitated vessel. The taste potentiator(s) then may be dispersed in the solution. The solution, or suspension, may be spray dried using a spray dryer fitted with an air atomized nozzle at elevated temperatures to form the encapsulated particles.

In other embodiments, the encapsulated particles may be prepared by any suitable spray coating method as known in the art. One suitable process is the Wurster process. This process provides a method for encapsulating individual particulate materials. First, the particles to be encapsulated are suspended in a fluidizing air stream, which provides a generally cyclic flow in front of a spray nozzle. The spray nozzle sprays an atomized flow of the coating solution, which may include the encapsulant(s) and a suitable solvent. The atomized coating solution collides with the particles as they are carried away from the nozzle to provide a particle coating with the coating solution. The temperature of the fluidizing air stream, which also serves to suspend the particles to be coated, may be adjusted to evaporate the solvent shortly after the coating solution contacts the particles. This serves to solidify the coating on the particles, resulting in the desired encapsulated particle.

In some embodiments, at least one active substance may be combined in the first step of the process along with the encapsulant(s) and the taste potentiator(s) to form a dispersion of all the components. The active substance(s) thereby may be encapsulated with the taste potentiator(s) to form an encapsulated mixture of the components.

Once the encapsulated particles are obtained, they may be added to a chewing gum composition. Such encapsulated particles also may be added to confectionery compositions to prepare any of the confectionery products described above. The chewing gum composition may be prepared using standard techniques and equipment, as described above. The encapsulated particles may be added to the chewing gum composition to enhance the perception of at least one active substance contained therein, which may be any of the actives described above. Once the encapsulated particles are mixed into the chewing gum composition, individual chewing gum pieces may be formed using standard techniques known in the chewing gum art. For instance, chewing gum pieces may be prepared in the form of a slab, pellet, stick, center-fill gum, deposited, compressed chewing gum or any other suitable format.

For instance, center-fill chewing gum embodiments may include a center-fill region, which may be a liquid or powder or other solid, and a gum region. Some embodiments also may include an outer gum coating or shell, which typically provides a crunchiness to the piece when initially chewed. The outer coating or shell may at least partially surround the gum region. The potentiator compositions described above may be incorporated into any of the regions of the center-fill chewing gum, i.e., the center-fill region, gum region and/or outer coating of the gum. Alternatively, the taste potentiator(s) may be incorporated into one region while the active substance(s) is incorporated into a different region of the center-fill gum. Upon consumption, the taste-potentiator(s) and active(s) may release from the different regions and combine as the gum is chewed. Center-fill chewing gums and methods of preparing same are more fully described in assignee's co-pending U.S. patent application Ser. No. 10/925,822, filed on Aug. 24, 2004 and assignee's co-pending U.S. patent application Ser. No. 11/210,954, filed on Aug. 24, 2005, both entitled "Liquid-Filled Chewing Gum Composition," the contents both of which are incorporated herein by reference.

Some other chewing gum embodiments may be in a compressed gum format, such as, for example, a pressed tablet gum. Such embodiments may include a particulate chewing gum base, which may include a compressible gum base composition and a tableting powder, and any of the potentiator compositions described above. In such embodiments, the potentiator composition may be in a powdered form. Compressed chewing gums are more fully described in assignee's co-pending U.S. Provisional Application No. 60/734,680, filed on Nov. 8, 2005, and entitled "Compressible Gum System," the contents of which are incorporated herein by reference.

In some embodiments, the chewing gum may have a coating thereon. Such coated chewing gums are typically referred to as pellet gums. The outer coating may be hard or crunchy. Any suitable coating materials known to those skilled in the art may be employed. Typically, the outer coating may include sorbitol, maltitol, xylitol, isomalt, erythritol and other crystallizable polyols; sucrose may also be used. Furthermore the coating may include several opaque layers, such that the chewing gum composition is not visible through the coating itself, which can optionally be covered with a further one or more transparent layers for aesthetic, textural and protective purposes. The outer coating may also contain small amounts of water and gum arabic. The coating can be further coated with wax. The coating may be applied in a conventional manner by successive applications of a coating solution, with drying in between each coat. As the coating dries it usually becomes opaque and is usually white, though other colorants may be added. A polyol coating can be further coated with wax. The coating can further include colored flakes or speckles. If the composition includes a coating, it is possible that one or more oral care actives can be dispersed throughout the coating. This is especially preferred if one or more oral care actives is incompatible in a single phase composition with another of the actives. Flavors may also be added to yield unique product characteristics.

Other materials may be added to the coating to achieve desired properties. These materials may include without limitations, cellulosics such as carboxymethyl cellulose, gelatin, xanthan gum and gum arabic.

The coating composition may be applied by any method known in the art including the method described above. The coating composition may be present in an amount from about 2% to about 60%, more specifically from about 25% to about 45% by weight of the total chewing gum piece.

Similarly, some embodiments extend to methods of preparing a taste potentiator composition having controlled-release upon consumption. In accordance therewith, at least one taste potentiator may first be provided. The taste potentiator(s) may be mixed with an encapsulant to form a composition having a dispersion of the components. Once the components are fully dispersed, a plurality of encapsulated taste potentiator particles may be formed from the composition, as described above. As a consequence of the encapsulation, the release rate of the potentiator(s) will be modified. The material for use as the encapsulant may be selected to provide either a delayed or increased release rate of the potentiator(s) upon consumption of the composition.

The features and advantages of the present invention are more fully shown by the following examples which are provided for purposes of illustration, and are not to be construed as limiting the invention in any way.

EXAMPLES

Example 1

TABLE 2

Encapsulated Water-Soluble Taste Potentiator

| Component | Weight % |
| --- | --- |
| Polyvinyl acetate (encapsulant) | 65.00 |
| Hydrogenated Oil | 3.75 |
| Glycerol Monostearate | 1.25 |
| Neohesperidindihydrochalcone | 30.00 |

A potentiator composition is prepared according to the formulation in Table 2 above.

The polyvinyl acetate is melted at a temperature of about 90° C. in a high shear mixer. A single or twin-screw extruder, a sigma mixer or a Banbury mixer may be used. The hydrogenated oil and glycerol monostearate are added to the molten polyvinyl acetate. Neohesperidindihydrochalcone (NHDC), which is a water-soluble taste potentiator, is added to the resulting mixture and mixed under high shear to completely disperse the components. The resulting filled polymer melt is cooled and ground to a particle size of less than 420 microns. The encapsulated particles provide a slow releasing NHDC. The particles are stored in air tight containers with low humidity below 35° C. until they are incorporated into consumable products, such as chewing gum.

Example 2

TABLE 3

Encapsulated Mixture of Taste Potentiator and Sweetener

| Component | Weight % |
|---|---|
| Polyvinyl acetate (encapsulant) | 65.00 |
| Hydrogenated Oil | 3.75 |
| Glycerol Monostearate | 1.25 |
| Aspartame | 26.00 |
| Neohesperidindihydrochalcone | 4.00 |

A potentiator composition is prepared according to the formulation in Table 3 above.

The polyvinyl acetate is melted at a temperature of about 90° C. in a high shear mixer. A single or twin-screw extruder, a sigma mixer or a Banbury mixer may be used. The hydrogenated oil and glycerol monostearate are added to the molten polyvinyl acetate. NHDC, which is a water-soluble taste potentiator, and aspartame are added to the resulting mixture and mixed under high shear to completely disperse the components. The resulting filled polymer melt is cooled and ground to a particle size of less than 420 microns. The encapsulated particles provide a delayed and combined release mixture of NHDC and aspartame. The particles are stored in air tight containers with low humidity below 35° C. until they are incorporated into consumable products, such as chewing gum.

Example 3

TABLE 4

Encapsulated Low Water-Soluble Taste Potentiator

| Component | Weight % |
|---|---|
| Maltitol (encapsulant) | 90.00 |
| Sweetener Potentiator | 9.00 |
| Glycerol Monostearate | 1.00 |

A potentiator composition is prepared according to the formulation in Table 4 above.

The maltitol is melted at a temperature of about 140° C. in a high shear mixer. A single or twin-screw extruder, a sigma mixer or a Banbury mixer may be used. The glycerol monostearate is added to the molten maltitol. The sweetener potentiator, which exhibits low solubility in water, is added to the resulting mixture and mixed under high shear to completely disperse the components. The resulting melt is cooled and ground to a particle size of less than 590 microns. The encapsulation provides an increased release rate of the sweetener potentiator upon consumption. The encapsulated particles are stored in air tight containers with low humidity below 35° C. until they are incorporated into consumable products, such as chewing gum.

Example 4

TABLE 5

Encapsulated Low Water-Soluble Taste Potentiator

| Component | Weight % |
|---|---|
| Water | 60.00 |
| Maltitol (encapsulant) | 34.00 |
| Acetylated monoglyceride | 3.00 |
| Sweetener Potentiator | 3.00 |

A potentiator composition is prepared according to the formulation in Table 5 above.

The maltitol and acetylated monoglyceride are dissolved in water at a temperature of about 70° C. in an agitated vessel. The sweetener potentiator, which exhibits low solubility in water, is dispersed in the resulting solution. The solution, or suspension, is spray dried using a spray dryer fitted with an air atomized nozzle (stationary or rotary) at about 105° C. to form encapsulated particles. The encapsulation provides an increased release rate of the substantially water-insoluble sweetener potentiator upon consumption. The encapsulated particles are stored in air tight containers with low humidity below 35° C. until they are incorporated into consumable products, such as chewing gum.

Example 5

TABLE 6

Encapsulated Low Water-Soluble Taste Potentiator

| Component | Weight % |
|---|---|
| Beta-cyclodextrin (encapsulant) | 25.00 |
| Sweetener Potentiator | 5.00 |
| Water | 50 |
| Ethanol | 20.00 |

A potentiator composition is prepared according to the formulation in Table 6 above.

The beta-cyclodextrin is dissolved in water at a temperature of about 60° C. The sweetener potentiator, which exhibits low solubility in water, is dissolved completely in the ethanol and the resulting solution is added to the beta-cyclodextrin solution and stirred for about three hours. The resulting solution of beta-cyclodextrin complex is spray dried using a spray dryer fitted with an air atomized nozzle (stationary or rotary) at about 60° C. to form encapsulated particles. The encapsulation provides an increased release rate of the substantially water-insoluble sweetener potentiator upon consumption. The encapsulated particles are stored in air tight containers with low humidity below 35° C. until they are incorporated into consumable products, such as chewing gum.

Example 6

TABLE 7

Chewing Gum Containing Encapsulated Taste Potentiator

| Component | Weight % |
|---|---|
| Gum base | 39.00 |
| Sorbitol | 45.58 |
| Mannitol | 9.00 |
| Flavor | 3.67 |
| Glycerin | 1.50 |
| Lecithin | 0.20 |
| High intensity sweeteners[1] | 1.00 |
| Encapsulated NHDC[2] | 0.05 |

[1]Aspartame, Acesulfame-K and/or sucralose
[2]From Example 1

A chewing gum composition is prepared according to the formulation in Table 7 above.

The gum base is melted in a mixer. The remaining components listed in Table 7 are added to the molten gum base. The melted gum base and added components are mixed to completely disperse the components. The resulting chewing gum composition is allowed to cool. The cooled chewing gum composition is sized and conditioned for about a week, formed into individual chewing gum pieces employing conventional techniques and packaged.

Example 7

Sucrose Equivalent Value (SEV)

One method of measuring the perceived sweetness of a solution is to match it with a stock sucrose solution of known concentration. In the present experiments, the compound of interest is added at a predetermined concentration to a pH 3.2 buffered solution containing 5% sucrose. A number of expert panel members then taste the solution and compare it to a battery of stock sucrose solutions ranging from 3% to 15% at increments of 1%. Each panel member decides which sucrose solution is equisweet with the solution containing the compound of interest. The mean value is then reported as the SEV. Results are reported to 1 decimal place.

Dose Response Curve for 3-Hydroxybenzoic Acid

In accordance with this methodology, 3-HB was added to a pH 3.2 buffered solution containing 5% sucrose to produce solutions containing from 0 to 1000 ppm 3-HB in 100 ppm increments. The SEV for each solution was plotted on a graph to produce a dose response curve (FIG. 1), from which it can be seen that 3-HB enhances the sweetness of the sucrose solution within this range. From FIG. 1 it is apparent that as the dosage of 3-HB increases so does the sweetness of the resultant solution. However the effect is non-linear with each incremental addition having a diminishing effect. The maximum sweetness attainable would appear to be about 7.9% SEV (based on a 5% sucrose solution).

Example 8

Dose Response Curve for 2,4-Dihydroxybenzoic Acid

Figure 2:
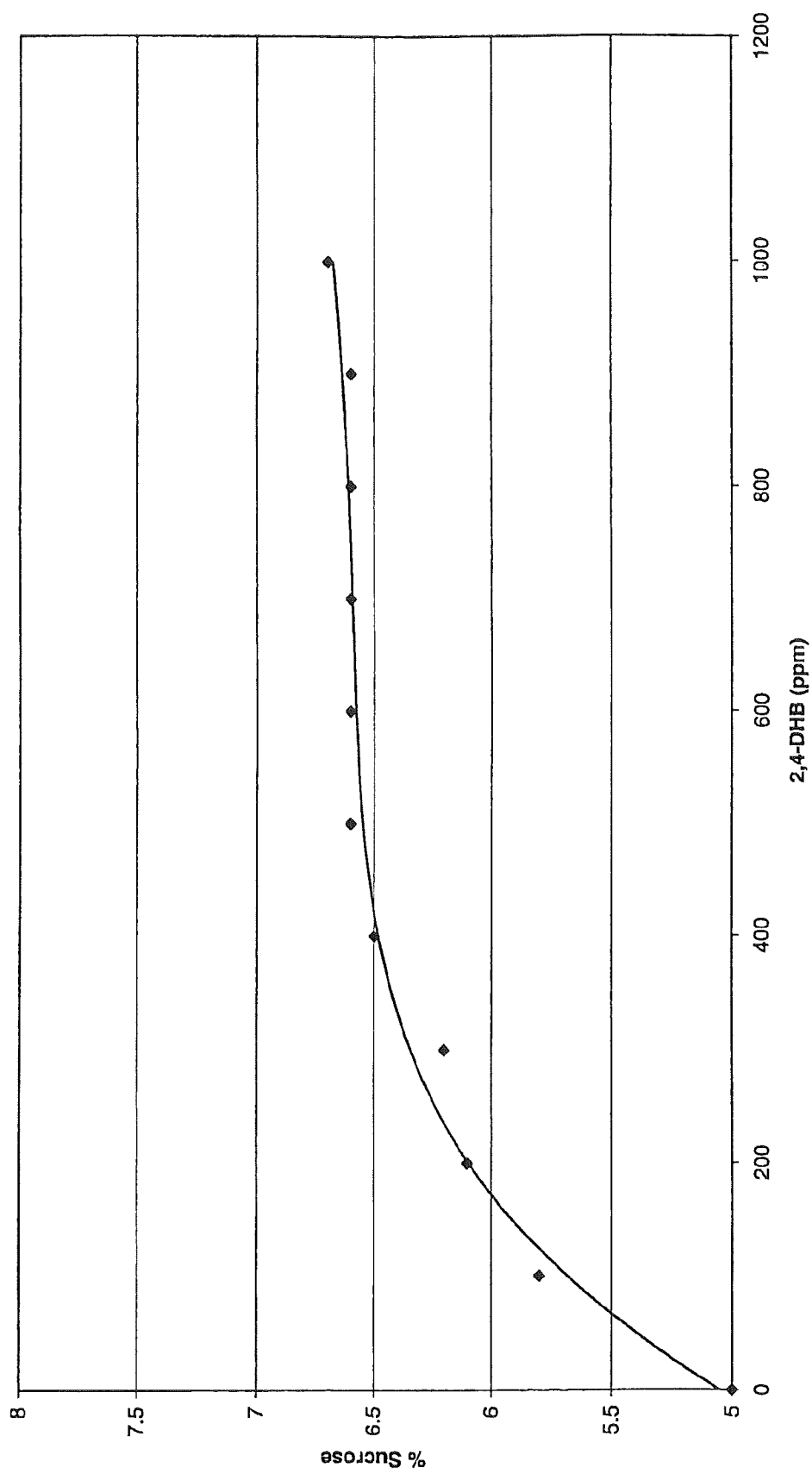
FIG. 2 is a graph of 2,4-dihydroxybenzoic acid concentration against perceived sweetness.

The same methodology as described in Example 7 was repeated with 2,4-DHB in place of 3-HB, to produce the dose response curve for 2,4-DHB (FIG. 2). From FIG. 2 it can be seen that 2,4-DHB also enhances the sweetness of the sucrose solution but there is little difference between the 400 ppm solution (SEV 6.5%) and the 1000 ppm solution (SEV 6.7%). The maximum attainable sweetness would appear to be about 6.7% SEV (based on a 5% sucrose solution).

Example 9

Sucrose Reduction Method

An alternative method of measuring perceived sweetness is to determine how much sucrose can be replaced through the use of the compound of interest without any perceived loss of sweetness. In the present experiments the control was a pH 3.2 buffered solution containing 10% sucrose. The compound of interest is added at a predetermined concentration to a number of sucrose solutions containing from 5% to 10% sucrose at increments of 0.5%. Each panel member tastes each of the solutions, compares it to the control sample and decides which solutions are equisweet. For example, if the 8% sucrose solution containing the compound of interest is equisweet with the control, then the sucrose reduction achieved by the compound of interest is 20%.

Effect of Relative Concentration on Sucrose Reduction for 3-HB, 2,4-DHB mixtures A series of sucrose solutions were prepared containing 3-HB and 2,4-DHB at a combined concentration of 1000 ppm. Each solution was evaluated using the sucrose reduction method described above to determine how much sucrose could be replaced without noticeable loss of sweetness. The results are shown in FIG. 3.

Figure 3:
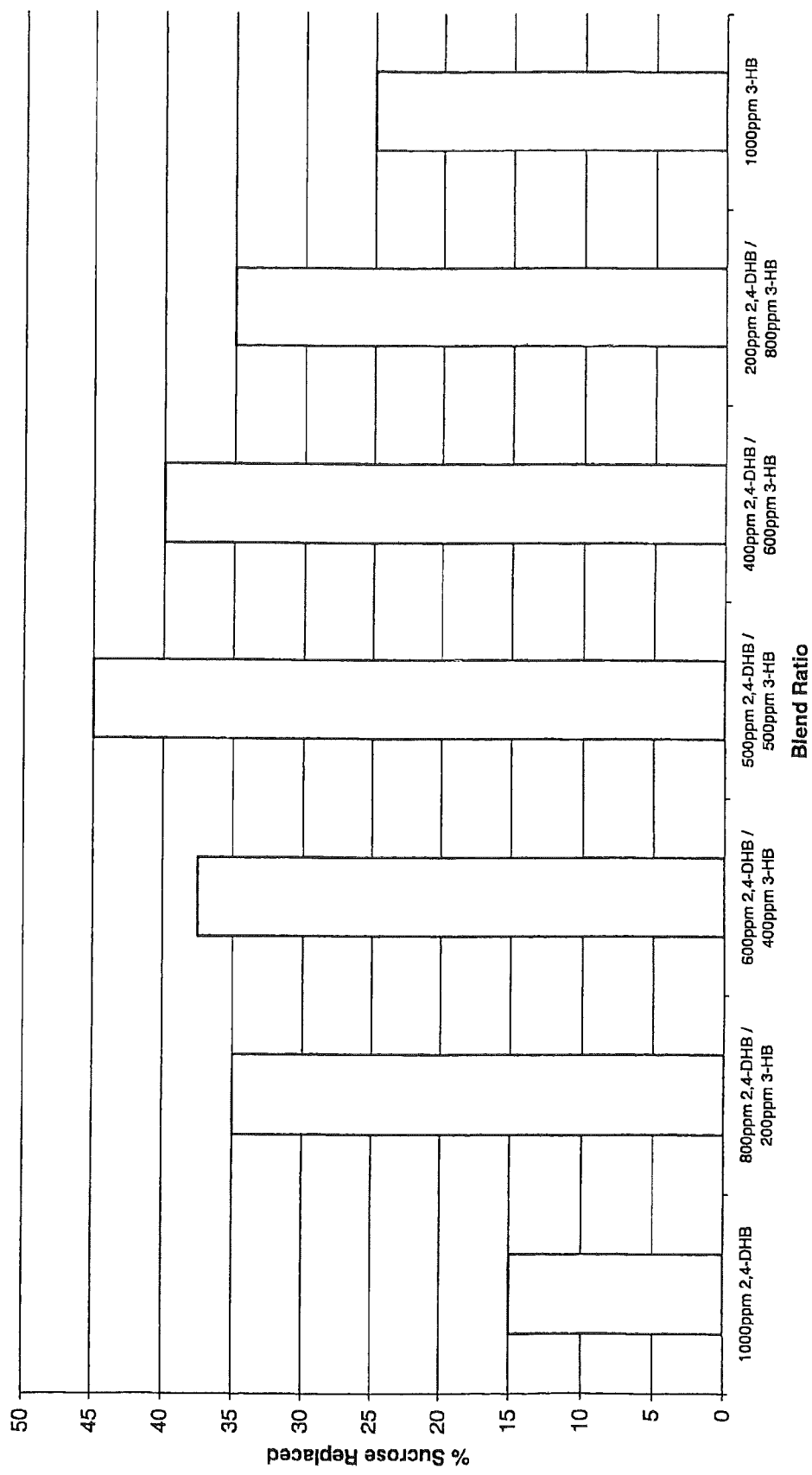
FIG. 3 is a bar chart of sucrose reduction for solutions containing 3-hydroxybenzoic acid and 2,4-dihydroxybenzoic acid in a number of different ratios.

As shown in FIG. 3, the greatest reduction is observed when equal quantities of 3-HB and 2,4-DHB are employed. This ratio results in the very significant sucrose reduction of 45%. This figure is highly surprising considering that the use of 1000 ppm of 3-HB or 2,4-DHB individually results in a reduction of just 25% and 15% respectively. The other ratios 3-HB:2,4-DHB (8:2, 6:4, 4:6 and 2:8) are also very effective; each combination results in a sucrose reduction of at least 35%.

Example 10

Effect of Concentration on Sucrose Reduction for 1:1 3-HB:2,4-DHB mixtures

Figure 4:
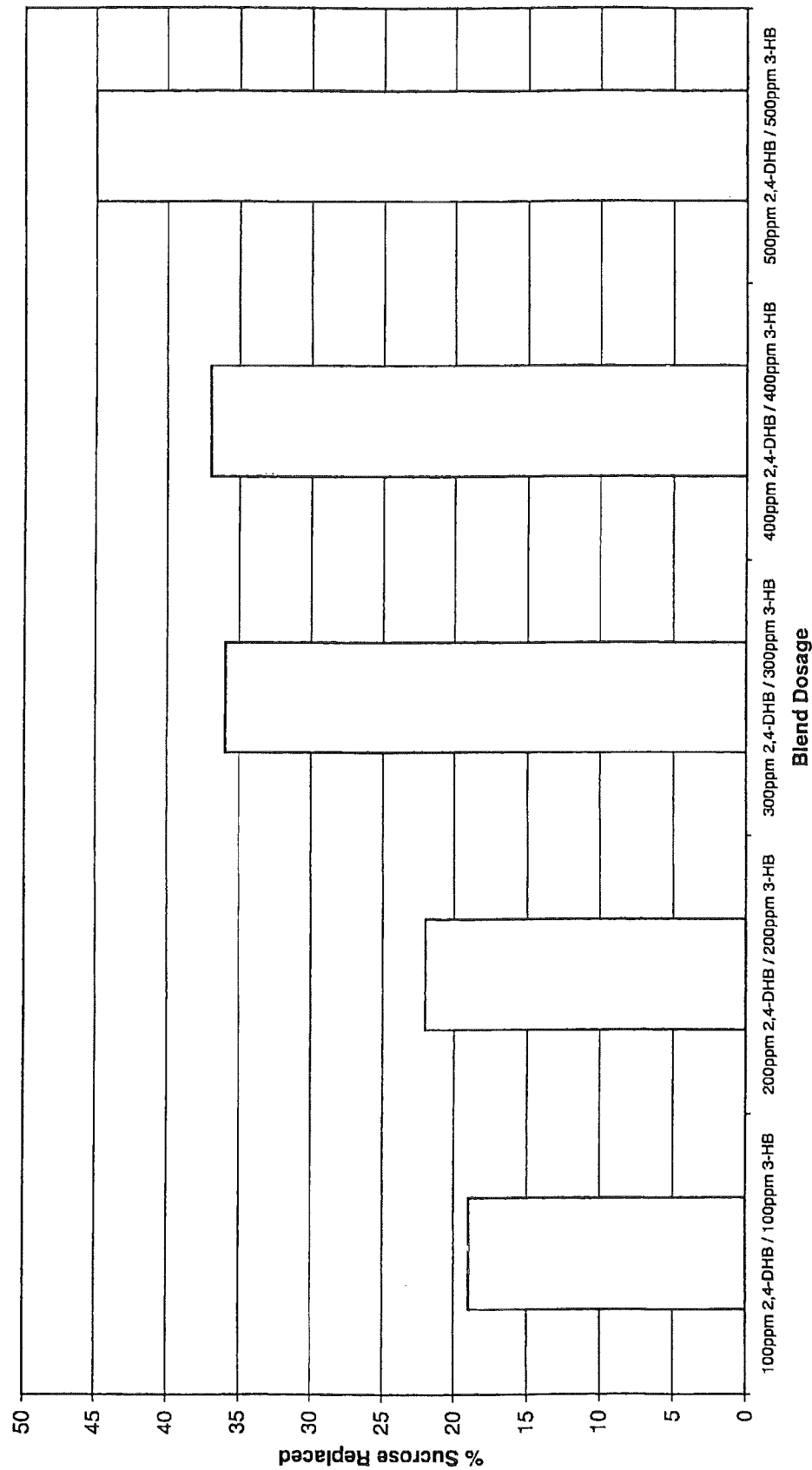
FIG. 4 is a bar chart of sucrose reduction for solutions containing 3-hydroxybenzoic acid and 2,4-dihydroxybenzoic acid at a number of different concentrations.

A series of sucrose solutions were prepared containing equal quantities of 3-HB and 2,4-DHB, at a combined concentration of 200, 400, 600, 800 and 1000 ppm. Each solution was evaluated using the sucrose reduction method described in Example 9 above to determine how much sucrose could be replaced without noticeable loss of sweetness. The results are shown in FIG. 4.

Increasing the total quantity of 3-HB and 2,4-DHB while retaining a 1:1 ratio increases the sweetness enhancing effect. As shown above 500 ppm 3-HB+500 ppm 2,4-DHB results in 45% of the sucrose being replaced without loss of sweetness. However, the combination of 3-HB and 2,4-DHB is effective even at very low concentration. The use of just 200 ppm of each of 3-HB and 2,4-DHB allows the sucrose content to be reduced by 22%.

Example 11

Sucrose Equivalent Values for Various Benzoic Acid Derivatives and Combinations Thereof 500 ppm of a sweetener potentiator was added to a pH 3.2 buffered solution containing 5% sucrose and the SEV of the resultant solution determined. The results are shown in Table 8.

TABLE 8

| Sweetness potentiator | SEV (%) |
|---|---|
| 2-hydroxybenzoic acid (2-HB) | 5.6 |
| 3-hydroxybenzoic acid (3-HB) | 6.9 |
| 4-hydroxybenzoic acid (4-HB) | 5.2 |
| 2,3-dihydroxybenzoic acid (2,3-DHB) | 6.3 |
| 2,4-dihydroxybenzoic acid (2,4-DHB) | 6.5 |
| 2,5-dihydroxybenzoic acid (2,5-DHB) | 5.3 |
| 2,6-dihydroxybenzoic acid (2,6-DHB) | 5.3 |
| 3,4-dihydroxybenzoic acid (3,4-DHB) | 6.4 |
| 3,5-dihydroxybenzoic acid (3,5-DHB) | 5.3 |
| 2,3,4-trihydroxybenzoic acid (2,3,4-THB) | 5.4 |
| 2,4,6-trihydroxybenzoic acid (2,4,6-THB) | 5.4 |
| 3,4,5-tryhydroxybenzoic acid (3,4,5-THB) | 5.1 |

Figure 5:
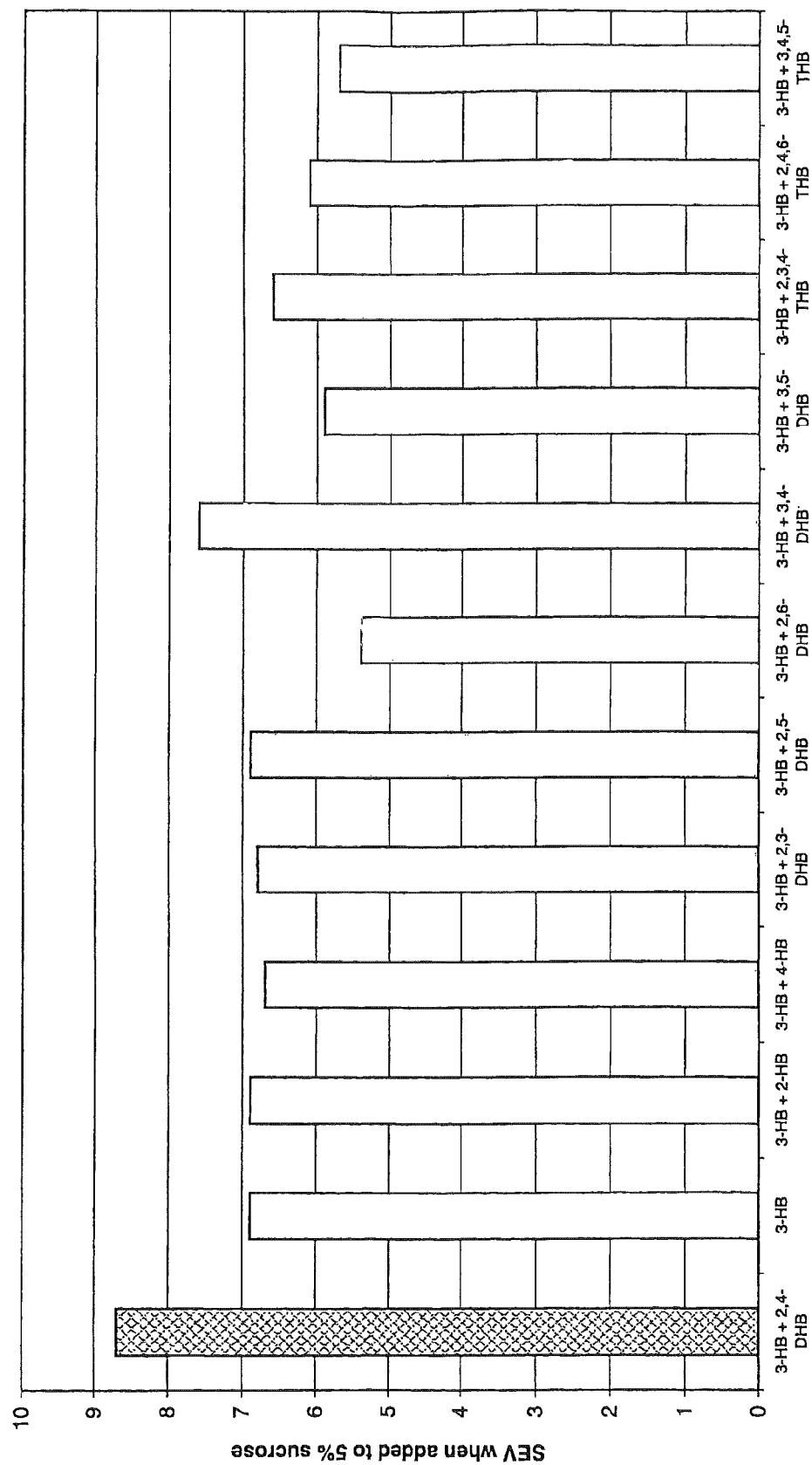
FIG. 5 is a bar chart of perceived sweetness for a number of solutions containing substituted benzoic acids.

500 ppm of the sweetener potentiator then was added to a 5% sucrose solution containing 500 ppm 3-HB to produce a series of solutions. The SEV for each solution was determined and the results are shown in FIG. 5. As shown in FIG. 5, the composition of one embodiment (hatched) is considerably more effective than any other combination with an SEV of 8.7%. The use of 500 ppm of 3-HB alone results in an SEV of 6.9% whereas in all cases but two (2,4-DHB and 3,4-DHB) the addition of a second sweetener potentiator results in a little change or even a decrease in SEV. This is highly surprising considering that all of the potentiators are shown to have SEVs greater than 5%.

Figure 6:
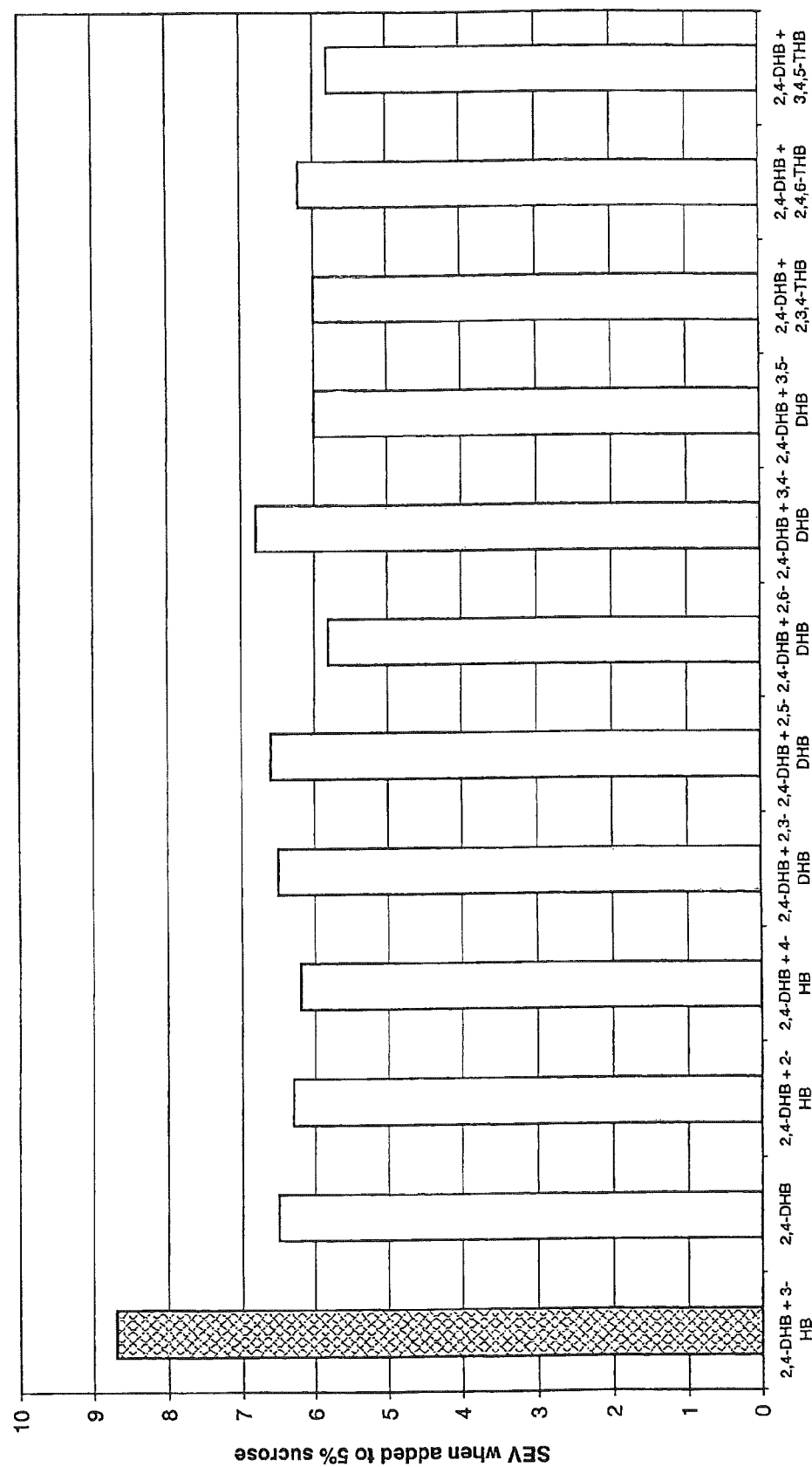
FIG. 6 is a bar chart of perceived sweetness for a number of solutions containing substituted benzoic acids.

The methodology was repeated to produce a series of solutions containing 500 ppm 2,4-DHB and 500 ppm of a second sweetener potentiator. The SEV for each solution was determined and the results are shown in FIG. 6.

Again the combination (hatched) of 3-HB and 2,4-DHB results in by far the greatest sweetness enhancement. It might be expected that 2-HB or 4-HB could be used in place of 3-HB but these combinations result in solutions with SEVs of just 6.3% and 6.2% respectively. The use of 500 ppm 2,4-DHB alone results in a solution with an SEV of 6.5%. The addition of a second sweetener potentiator appears to inhibit its effect in most cases and only the addition of 3-HB has a significant positive effect.

Figure 7:
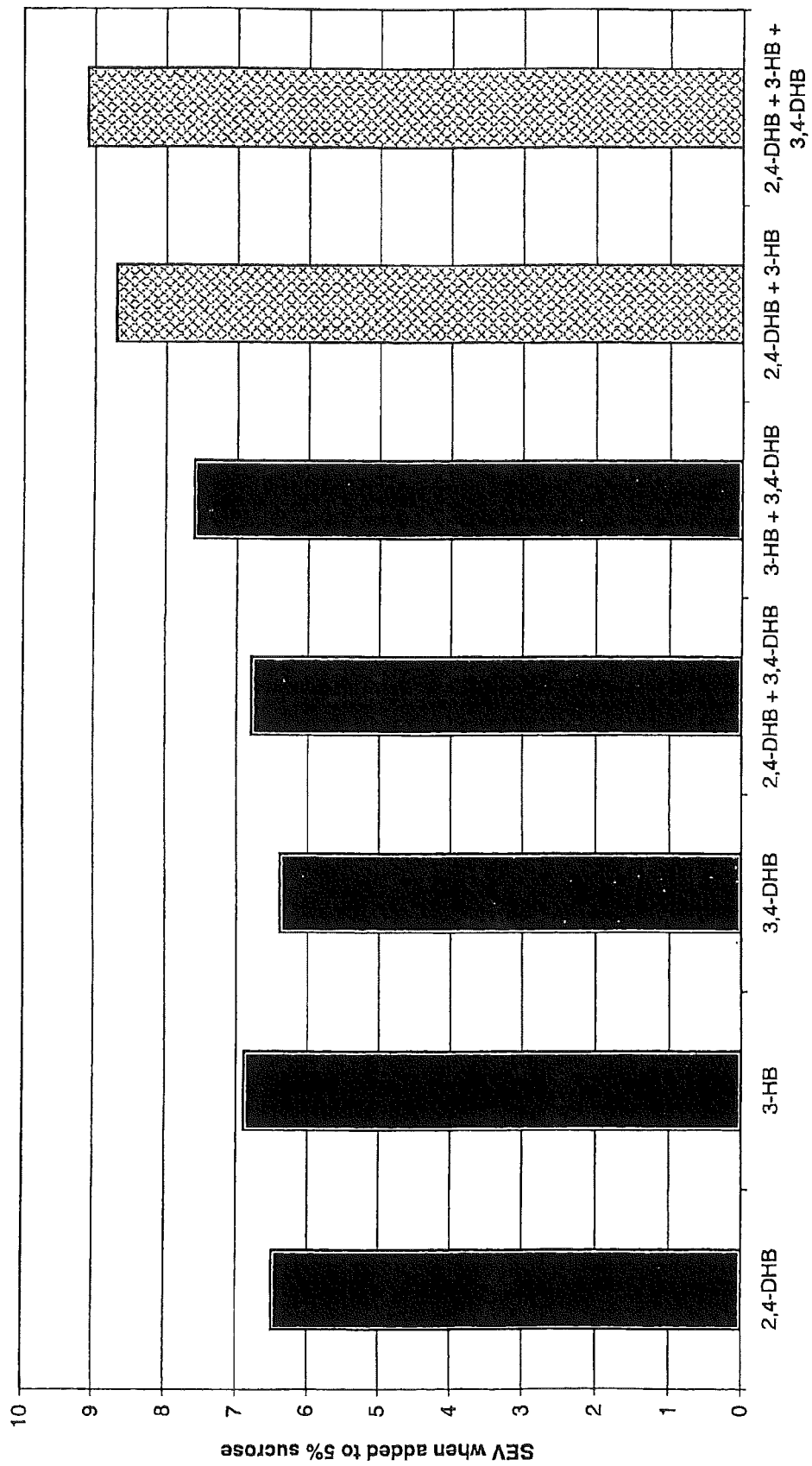
FIG. 7 is a bar chart of perceived sweetness for a number of solutions containing 3-hydroxybenzoic acid, 2,4-dihydroxybenzoic acid and 3,4-dihydroxybenzoic acid, in various combinations.

500 ppm of 3-HB, 500 ppm of 2,4-DHB and 500 ppm of 3,4-dihydroxybenzoic acid (3,4-DHB) were added to a pH 3.2 buffered solution containing 5% sucrose and the SEV determined. The results are shown in FIG. 7 together with other combinations of 3-HB, 2,4-DHB and 3,4-DHB for comparison. The solution containing the combination of 3-HB and 2,4-DHB (hatched) has a much higher SEV (8.7%) than the combination of either 3,4-DHB and 3-HB (7.6%) or the combination of 3,4-DHB and 2,4-DHB (6.8%). The three-way combination of the embodiment (hatched) is better still with an SEV of 9.8%.

Example 12

Comparison of Different Forms of 2,4-DHB pH 3.2 buffered solutions were prepared containing 0%, 3%, 5%, 7% and 9% sucrose. 500 ppm of 2,4-DHB acid, 500 ppm of the sodium salt of 2,4-DHB and 500 ppm of the potassium salt of 2,4-DHB were added individually to each of the sucrose solutions. The SEV for each of the solutions was then determined. The results are shown in FIG. 8.

Figure 8:
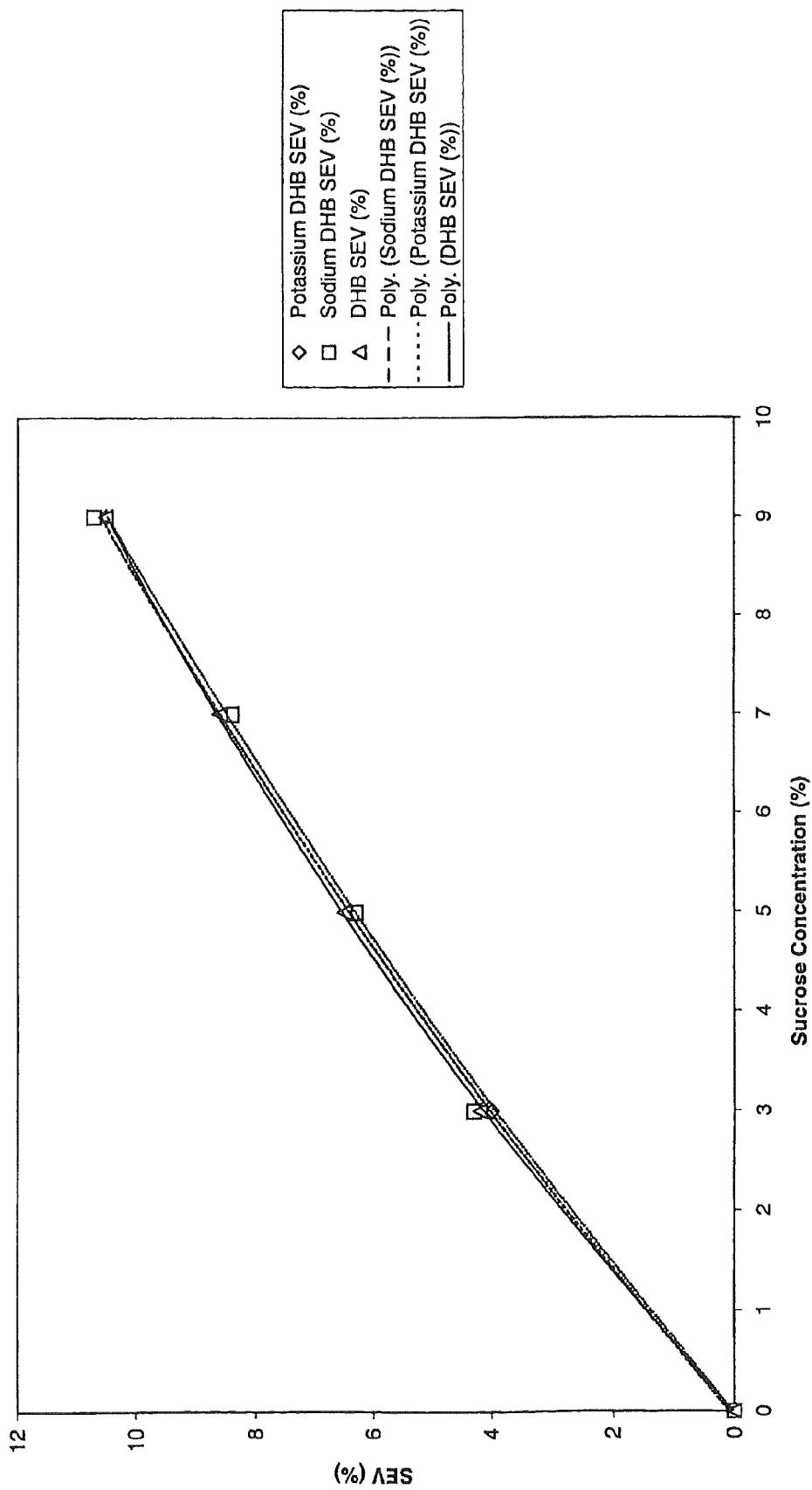
FIG. 8 is a graph of perceived sweetness for sucrose solutions containing 2,4-dihydroxybenzoic acid, its potassium salt or its sodium salt against sucrose concentration.

As shown in FIG. 8, the addition of 2,4-DHB enhances the sweetness of the sucrose solution in every case regardless of the original sucrose solution or whether the acid, sodium salt or potassium salt is employed. The results for the acid, sodium salt and potassium salt are almost identical indicating that the sweetener potentiator composition may be prepared from the acids and/or from their comestible salts.

Example 13

Sweetness Enhancing Effect of 3-HB and 2,4-DHB on Non-Sucrose Sweeteners

Solutions were prepared at a pH of 3.2 containing a sufficient quantity of a non-sucrose sweetener so that the resulting solution had an SEV of about 5%. The SEV of each sweetener solution was then evaluated after the addition 500 ppm of 3-HB, the addition of 500 ppm of 2,4-DHB and the addition of both 500 ppm 3-HB and 2,4-DHB. The results are shown in FIGS. 9 and 10.

Figure 9:
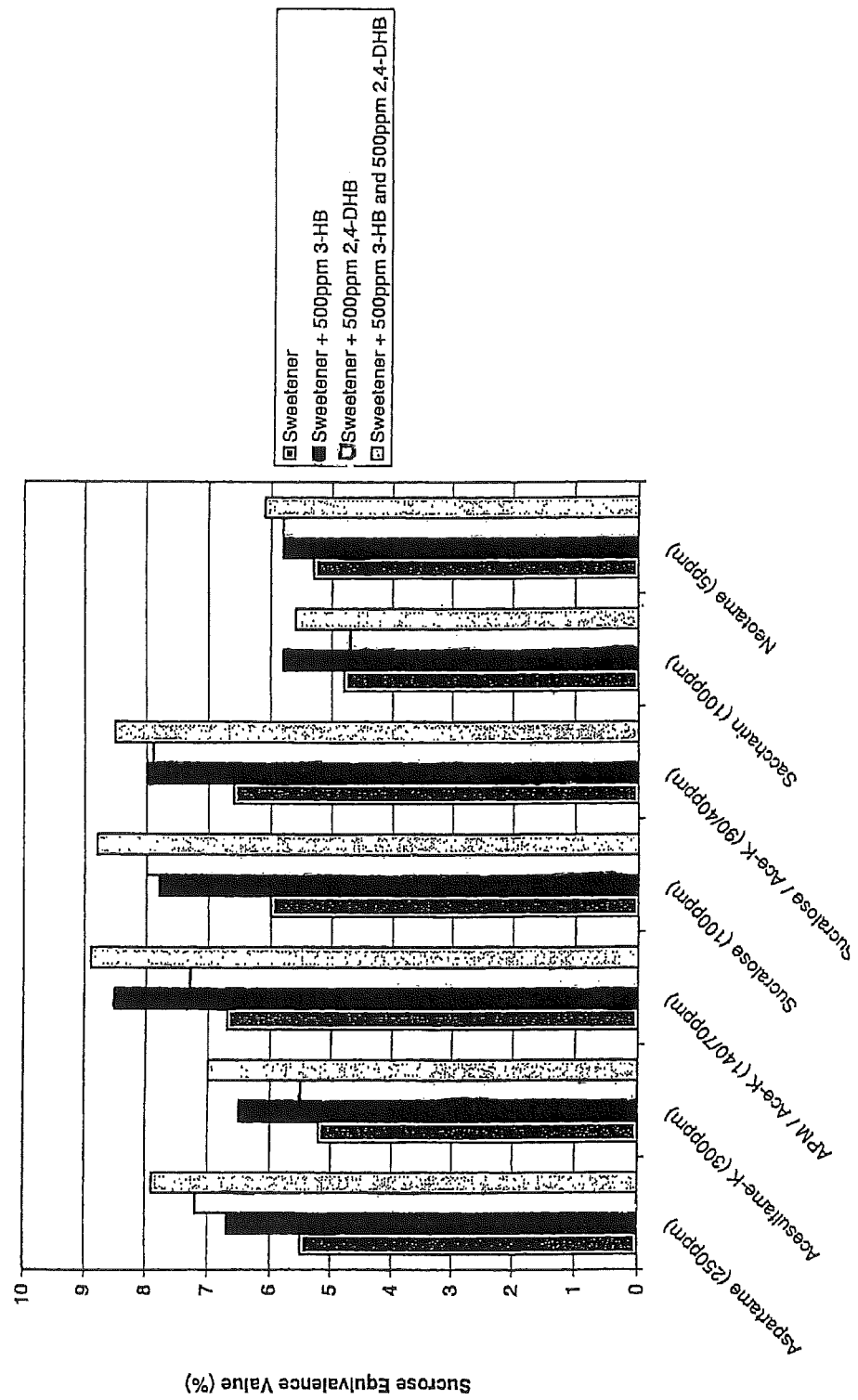
FIG. 9 is a bar chart of perceived sweetness for solutions containing intense sweeteners.

FIG. 9 shows the results of various intense sweeteners with 3-HB, 2,4-DHB and combinations thereof. As shown in FIG. 9, the combination of 3-HB and 2,4-DHB with aspartame has a significant effect on SEV, which is greater than the use of either 3-HB or 2,4-DHB separately. Similarly, the combination of 3-HB and 2,4-DHB enhances the perceived sweetness of the acesulfame-K, aspartame/acesulfame-K, sucralose, sucralose/acesulfame-K, saccharin and neotame solutions. With respect to the saccharin solution, however, 3-HB enhances the sweetness to a greater degree alone than in combination with 2,4-DHB.

FIG. 10 shows the results of various bulk sweeteners with 3-HB, 2,4-DHB and combinations thereof. As seen in FIG. 10, the combination of 3-HB and 2,4-DHB increases the SEV of the resultant solution when used with sucrose, fructose, tagatose, maltitol or glucose to a greater extent than either 3-HB or 2,4-DHB separately.

Example 14

Sucrose Equivalent Values for Aminobenzoic Acid Derivatives 500 ppm of 3-aminobenzoic acid and 500 ppm of 4-aminobenzoic acid were individually added to separate pH 3.2 buffered solutions containing 5% sucrose and the SEVs of the resultant solutions were determined. The SEV of 3-aminobenzoic acid was about 7%, i.e., increased the sweetness intensity of 5% sucrose to about 7%. The SEV of 4-aminobenzoic acid was about 5.5-6%, i.e., increased the sweetness intensity of 5% sucrose to about 5.5-6%.

The invention claimed is:

1. A sweetener potentiator composition, comprising:
a first amount of 3-hydroxybenzoic acid; and
a second amount of 2,4-dihydroxybenzoic acid,
wherein said first amount is at least 200 ppm and said second amount is at least 200 ppm.

2. The sweetener potentiator composition of claim 1, wherein said first amount is at least 400 ppm.

3. The sweetener potentiator composition of claim 1, wherein said first amount is at least 500 ppm.

4. The sweetener potentiator composition of claim 1, wherein at least a portion of said first amount of 3-hydroxybenzoic acid is encapsulated.

5. The sweetener potentiator composition of claim 4, wherein at least a portion of said second amount of 2,4-dihydroxybenzoic acid is encapsulated.

6. The sweetener potentiator composition of claim 1, wherein at least a portion of said second amount of 2,4-dihydroxybenzoic acid is encapsulated.

7. The sweetener potentiator composition of claim 1, wherein said sweetener potentiator composition contains sufficient amounts of said first amount of 3-hydroxybenzoic acid and said second amount of 2,4-dihydroxybenzoic acid to create a sucrose equivalent value of at least seven %.

8. The sweetener potentiator composition of claim 1, wherein said sweetener potentiator composition contains sufficient amounts of said first amount of 3-hydroxybenzoic acid and said second amount of 2,4-dihydroxybenzoic acid to create a sucrose equivalent value of at least eight %.

9. The sweetener potentiator composition of claim 1, wherein said sweetener potentiator composition contains a ratio by weight of said first amount of 3-hydroxybenzoic acid to said second amount of 2,4-dihydroxybenzoic acid of 1:9 to 9:1.

10. The sweetener potentiator composition of claim 1, wherein said sweetener potentiator composition contains a ratio by weight of said first amount of 3-hydroxybenzoic acid to said second amount of 2,4-dihydroxybenzoic acid of 2:8 to 8:2.

11. The sweetener potentiator composition of claim 1, wherein said sweetener potentiator composition contains a ratio by weight of said first amount of 3-hydroxybenzoic acid to said second amount of 2,4-dihydroxybenzoic acid of 4:6 to 6:4.

12. The sweetener potentiator composition of claim 1, wherein said sweetener potentiator composition is in a form of a blended powder.

13. The sweetener potentiator composition of claim 1, further comprising a third amount of 3,4-dihydroxybenzoic acid.

14. The sweetener potentiator composition of claim 1, wherein said composition comprises a confectionery composition.

15. The sweetener potentiator composition of claim 1, further comprising a sweetener selected from the group consisting of Lo han guo, stevia, monatin and combinations thereof.

16. A composition comprising
a sweetener consisting of one or more members selected from the group consisting of sucrose, dextrose, maltose, dextrin, xylose, ribose, glucose, lactose, mannose, galactose, fructose, invert sugar, fructo-oligo saccharide syrups, partially hydrolyzed starch, corn syrup solids, isomaltulose, sorbitol, xylitol, erythritol, mannitol, galactitol, maltitol, lactitol, hydrogenated isomaltulose, hydrogenated starch hydrolysates, stevia, dihydrochalcones, monellin, steviosides, rebaudioside A, glycyrrhizin, dihydroflavenol, L-aminodicarboxylic acid aminoalkenoic acid ester amides, saccharin and its soluble salts, cyclamate salts, the sodium and ammonium and calcium salts of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide, L-aspartyl-L-phenylalanine methyl ester, L-alphaaspartyl-N-(2,2,4,4-tetramethyl-3-thietanyl)-D-alaninamide hydrate, methyl esters of L-aspartyl-L-phenylglycerine and L-aspartyl-L-2,5-dihydrophenyl-glycine, L-aspartyl-2,5-dihydro-L-phenylalanine, L-aspartyl-L-(1-cyclohexen)-alanine, chlorodeoxy sugar derivatives, thaumatococcus danielli, talin, monatin and its derivatives, and lo han guo; and
a sweetener potentiator composition, comprising:
a first amount of 3-hydroxybenzoic acid; and
a second amount of 2,4-dihydroxybenzoic acid,
wherein said first amount is at least 200 ppm and said second amount is at least 200 ppm.

\* \* \* \* \*